(12) United States Patent
Hasegawa et al.

(10) Patent No.: US 7,159,466 B2
(45) Date of Patent: Jan. 9, 2007

(54) PIEZO RESISTANCE TYPE SEMICONDUCTOR DEVICE AND ITS MANUFACTURING METHOD

(75) Inventors: Shin Hasegawa, Hadano (JP); Kazuo Kokumai, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 11/149,146

(22) Filed: Jun. 10, 2005

(65) Prior Publication Data

US 2005/0274191 A1    Dec. 15, 2005

(30) Foreign Application Priority Data

Jun. 15, 2004  (JP) .............................. 2004-176856
Dec. 28, 2004  (JP) .............................. 2004-380491

(51) Int. Cl.
*G01L 9/06*    (2006.01)
(52) U.S. Cl. .............................. 73/721; 73/727; 73/754
(58) Field of Classification Search ............ 73/721, 73/727, 754
See application file for complete search history.

(56) References Cited

U.S. PATENT DOCUMENTS

2002/0134177 A1 *  9/2002  Takeuchi et al. .............. 73/865

FOREIGN PATENT DOCUMENTS

JP     8-247874    9/1996
JP     2002-71492  3/2002

* cited by examiner

*Primary Examiner*—Edward Lefkowitz
*Assistant Examiner*—Andre Allen
(74) *Attorney, Agent, or Firm*—Fitzpatrick, Cella, Harper & Scinto

(57) ABSTRACT

In a piezo resistance type semiconductor device, a detecting sensitivity and output linearity are improved without increasing a forming region of a diaphragm. In a piezo resistance type semiconductor device having: a diaphragm; a supporting frame which is connected to an external periphery of the diaphragm, supports the diaphragm, and is formed relatively thicker than the diaphragm; and piezo resistance type stress detectors (4a, 4b) each for detecting a stress caused when the detector is distorted by deformation of the diaphragm by application of an acceleration or a pressure in the direction perpendicular to the diaphragm, at least a part of the diaphragm is cut off in a position where it is come into contact with the piezo resistance type stress detector and a groove is formed.

10 Claims, 16 Drawing Sheets

PIEZO RESISTANCE TYPE SEMICONDUCTOR DEVICE AND ITS MANUFACTURING METHOD

BACKGROUND OF THE INVENTION

1. Field of the Invention

The invention relates to a piezo resistance type semiconductor device formed by arranging a piezo resistor onto a semiconductor substrate and, more particularly, to a piezo resistance type semiconductor device in which detecting sensitivity is improved without increasing an area of a forming region of a diaphragm on a semiconductor substrate.

2. Related Background Art

In recent years, sensors to detect various physical amounts have been manufactured by applying a semiconductor device manufacturing technique. Semiconductor devices such as pressure sensor, acceleration sensor, and the like have also been manufactured as piezo resistance type semiconductor devices on the basis of the semiconductor device manufacturing technique. The piezo resistance type semiconductor devices are widely used in the fields of automobiles, household appliances, industrial apparatuses, measuring instruments, medical equipment, and the like.

FIG. 11A is a plan view showing a principle of such a kind of piezo resistance type semiconductor device. FIG. 11B is a cross sectional view taken along the alternate long and two short dashes line 11B—11B in FIG. 11A. In the piezo resistance type semiconductor device, a semiconductor substrate made of, for example, silicon is used, a hollow portion 2 is formed in a partial region of the semiconductor substrate from the back surface side thereof, and a diaphragm 3 is formed so that a thickness of semiconductor substrate in this region becomes thin. The diaphragm 3 is also called a membrane. In FIG. 11A, the region of the diaphragm 3 is shown as a hatched region drawn by unidirectional oblique lines. In the semiconductor substrate, a region which is located around the hollow portion 2 and thicker than the diaphragm 3 functions as a supporting frame 1 for the diaphragm 3. The diaphragm 3 is generally formed as a region having a flat square or rectangular shape or as a circular region. The diaphragm 3 is a region showing micro deformation along with an external force difference when a pressure difference occurs between one surface and the other surface of the semiconductor substrate or when acceleration is applied in the direction perpendicular to the diaphragm. In positions where on the surface of the semiconductor substrate including the diaphragm 3, a stress accompanied by the deformation occurs, diffusion resistors (piezo resistors) whose resistance values change in accordance with the stress are formed. The diffusion resistors are formed by, for example, a step of injecting ions of impurities into the semiconductor substrate and a subsequent diffusion step and construct piezo resistance type stress detectors 4. The stress detector 4 made by the piezo resistor is formed in an elongated shape and wiring patterns (not shown) are connected to both ends in the longitudinal direction of the stress detector 4. Thus, the resistance value can be measured. The shape of the piezo resistor is not limited to be rectilinear but can be formed in a U-character shape to thereby enable the resistance across the piezo resistor to be measured.

According to such a sensor, by detecting a resistance change in the stress detector 4, the external force difference between both sides of the diaphragm 3 can be detected. The upper surfaces of the diaphragm 3 and the supporting frame 1 including the stress detectors 4, that is, the whole surface of the surface side of the semiconductor substrate is covered with a protection film 5.

To improve detecting sensitivity, generally, the diffusion resistors are provided along the two opposite sides of the almost rectangular diaphragm 3, respectively, or the diffusion resistor is provided along each side of the almost rectangular diaphragm 3 and those diffusion resistors are electrically bridge-connected. Referring to the diagrams, the longitudinal directions of the stress detectors 4 provided along the pair of two opposite sides of the diaphragm 3 are parallel to the extending direction of the corresponding side. The longitudinal directions of the stress detectors 4 arranged near another pair of two opposite sides cross perpendicularly to the extending direction of the corresponding side. The stress detectors 4 can be enclosed in the diaphragm 3 or, as shown in FIGS. 11A and 11B, they can be also arranged over the diaphragm 3 and the supporting frame 1. There can be a case where all of the stress detectors 4 are located outside of the diaphragm in accordance with the stress. Since stress sensitivity characteristics in the stress detector 4 changes in dependence on the direction of a current flowing in the piezo resistor and the applying direction of the stress, by Wheatstone-bridge connecting the two pairs of stress detectors 4 arranged in the diaphragm 3 as mentioned above, the external force can be accurately measured with the high sensitivity.

Although the piezo resistance type semiconductor device has such a problem that it is easily influenced by a temperature, by providing a simple temperature compensating circuit, such a problem can be easily solved. There are also advantages in which the device can be relatively easily manufactured by using the ordinary semiconductor device manufacturing process, and the high sensitivity, miniaturization, and low costs can be easily accomplished by applying the present semiconductor fine patterning technique.

FIGS. 12A to 12D are cross sectional views sequentially showing manufacturing steps of the conventional piezo resistance type semiconductor device. First, as shown in FIG. 12A, the surface of a silicon semiconductor substrate 41 is coated with a photoresist 43. The photoresist 43 is patterned in accordance with the forming positions of the stress detectors 4. Subsequently, as shown in FIG. 12B, diffusion layers 42 are formed in an opening portion of the photoresist 43 by an ion injecting method or the like. The diffusion layer 42 is a layer which becomes the stress detector 4 comprising the piezo resistor (diffusion resistor). After that, as shown in FIG. 12C, the photoresist 43 is removed and, subsequently, a thermal treatment is executed, an interlayer insulation film, metal wirings, and a passivation film (passivation film) (they are not shown) are formed, and patterning is executed. Finally, as shown in FIG. 12D, by executing the patterning and etching from the back surface side of the silicon semiconductor substrate 41, the hollow portion 2 is formed so that the diaphragm 3 is formed. Thus, the piezo resistance type semiconductor device is obtained.

When the diaphragm is formed, the silicon semiconductor substrate is etched. As a method of etching silicon, wet etching using KOH (potassium hydroxide) or TMAH (tetramethyl ammonium hydride), dry etching using a fluorine/chlorine system gas, or the like has been put into practical use. At this time, an etching stopper layer is generally provided to uniform the thickness of diaphragm. A substrate in which the etching stopper layer has previously been formed is used. As a specific example, a silicon substrate in which a p-type diffusion layer of high concentration is buried or what is called an SOI (Silicon On Insulator) substrate in which a monocrystalline silicon layer is formed on an insulation layer (usually, silicon oxide film) is used.

As a technique for improving the detecting sensitivity of the piezo resistance type semiconductor device, a structure in which a V-shaped groove is formed on the diaphragm and stresses are concentrated on the piezo resistance type stress detector has been disclosed in Japanese Patent Application Laid-Open No. H08-247874 as a Japanese Patent Laid-Open Publication. FIG. 13A is a plan view showing the semiconductor device disclosed in the above Official Gazette. FIG. 13B is a cross sectional view of the semiconductor device shown in FIG. 13A. FIG. 13C is a cross sectional view of the semiconductor device in the state where an external force has been applied. The four stress detectors 4 are provided for the diaphragm 3 and a plurality of parallel grooves 6 are formed on the surface of the diaphragm 3 so that the stresses are concentrated on the stress detector 4.

Structures disclosed in Japanese Patent Application Laid-Open No. 2002-71492 as a Japanese Patent Laid-Open Publication are shown in FIGS. 14A to 14D. In the diaphragm, a thick film region 8 having a relatively large film thickness and a thin film region 7 having a relatively small film thickness are provided and the piezo resistance type stress detectors 4 are arranged in the thick film-region 8. Thus, the structure in which the stresses are concentrated on the piezo resistance type stress detector 4 is disclosed. Although the thickness of semiconductor substrate in the thick film region 8 is larger than that in the thin film region 7, it is smaller enough than the thickness of semiconductor substrate in the portion of the supporting frame around the diaphragm. According to the semiconductor device, on the diaphragm, the silicon layer in the portion away from the stress detector 4 is thinner than the silicon layer just under the stress detector 4 and the silicon layer near the periphery thereof. By using such a structure, the following effects can be expected. That is, (1) when the external force is applied to the diaphragm 3, the stresses are liable to be concentrated on the stress detector 4. Therefore, a micro external force and its change can be detected. (2) Since the stress detectors 4 are electrically insulated, there is no influence of a dark current due to a junction leakage or the like in a position near the substrate surface and the sensitivity can be improved.

FIGS. 14A to 14D correspond to examples of structures in which the thick film region 8 is set to different shapes and only the diaphragm portions are shown. A hatched portion shows the thick film region 8. A non-hatched (blank) portion shows the thin film region 7. In FIG. 14A, the thick film region 8 is formed in the center portion of the diaphragm so as to have an almost square shape. Further, the center portion of each side of the thick film region 8 and the center portion of each side of the external periphery of the diaphragm are connected in the thick film region 8, respectively. In FIG. 14B, the thick film region 8 is formed in a crucial shape so as to connect the center portions of the opposite sides of the external periphery of the diaphragm. In FIG. 14C, the thick film region 8 is formed in a line-shape so as to connect the center portions of one pair of opposite sides of the external periphery of the diaphragm. In FIG. 14D, the thick film regions 8 are formed toward the center of the diaphragm from the center portions of one pair of opposite sides of the external periphery of the diaphragm, respectively.

In a standard piezo resistance type semiconductor device 10 shown in FIGS. 11A and 11B, it has been known that when a length of one side of the diaphragm 3 is assumed to be (h) and a thickness of diaphragm 3 is assumed to be (a), the maximum stress occurring in the diaphragm 3 is proportional to $(h/a)^2$. It will be understood from the above principle that in order to increase the maximum stress and improve the detecting sensitivity, it is preferable to increase the length (h) of one side of the diaphragm or decrease the thickness (a). It is unpreferable to increase the length (h) of one side in order to miniaturize the semiconductor device. Therefore, in order to improve the detecting sensitivity of the semiconductor device without increasing a size of forming region of the diaphragm 3, it is demanded to decrease the thickness (a) of diaphragm 3. However, if the thickness (a) of diaphragm 3 is decreased, a mechanical strength of the diaphragm 3 decreases.

Also in the semiconductor device disclosed in the above Official Gazette, similarly, if an occupation ratio of the thin film region and grooves of the diaphragm is increased in order to promote the stress concentration, the strength of the diaphragm itself decreases. There is a fear that when the excessive external force is applied, the diaphragm is broken in this portion. According to those structures, the piezo resistance type stress detectors are mutually electrically separated by the PN junction, and the piezo resistance type stress detectors, the diaphragm, and the thick film region 8 of the diaphragm are also electrically separated by the PN junction. The piezo resistance type stress detector has a high resistance and the occurrence of a small PN junction leakage causes a fear of deterioration in stress detecting precision. If it is intended to completely perform the device separation or the like, in order to device-separate the stress detectors, a mask patterning step have to be newly added to the steps before and after the step of forming each device unit including the stress detectors. This results in an increase in manufacturing costs of the semiconductor devices.

It is, therefore, an object of the invention to provide a piezo resistance type semiconductor device which can improve detecting sensitivity without increasing a size of forming region of a diaphragm and in which an influence of a leakage current is eliminated and output linearity is improved.

SUMMARY OF THE INVENTION

According to the invention, there is provided a piezo resistance type semiconductor device comprising: a diaphragm; a supporting frame which supports the diaphragm at an external periphery thereof and is formed relatively thicker than the diaphragm; and piezo resistance type stress detectors each for detecting a stress caused when the detector is distorted by deformation of the diaphragm by application of an external force to the diaphragm, wherein in at least one of the piezo resistance type stress detectors, at least a part of the diaphragm is cut off in a position where the diaphragm is come into contact with such a piezo resistance type stress detector.

By constructing the semiconductor device as mentioned above, the stresses can be concentrated on the piezo resistance type stress detector 4 without causing the mechanical strength to be remarkably decreased in the diaphragm portion. The electric insulation performance and device separation between the piezo resistance type stress detectors and the diaphragm can be also improved. Thus, the detecting sensitivity and the linearity of the output can be improved without increasing a size of forming region of the diaphragm.

Other features and advantages of the present invention will be apparent from the following description taken in conjunction with the accompanying drawings, in which like reference characters designate the same or similar parts throughout the figures thereof.

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the invention will now be described with reference to the drawings. The embodiments which will be described hereinbelow relate to preferred embodiments of the invention, respectively, and various limitations which are technically preferable are applied thereto. However, the scope of the invention is not limited to those embodiments unless otherwise there is particularly a disclosure showing that a limitation is made in the following explanation.

First Embodiment

Figure 1A:
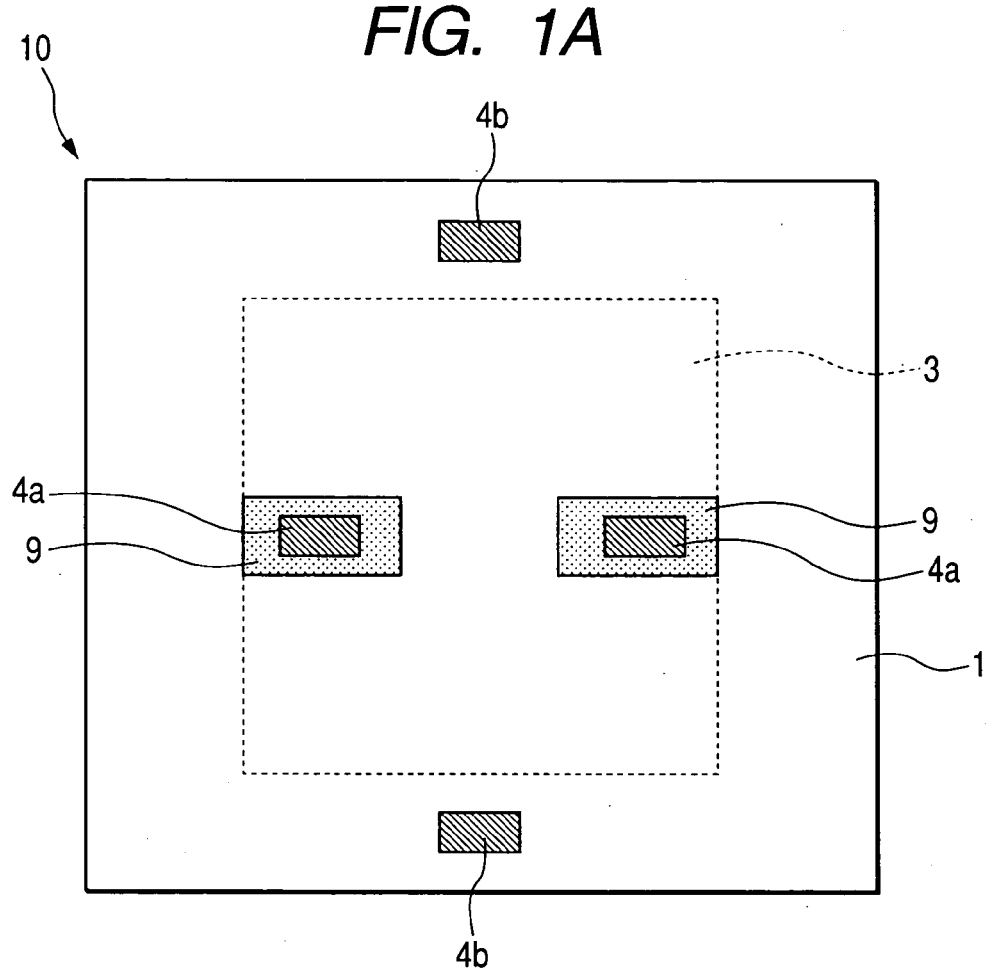
FIGS. 1A and 1B are a plan view and a cross sectional view of a piezo resistance type pressure sensor according to the first embodiment of the invention.
Figure 1B:
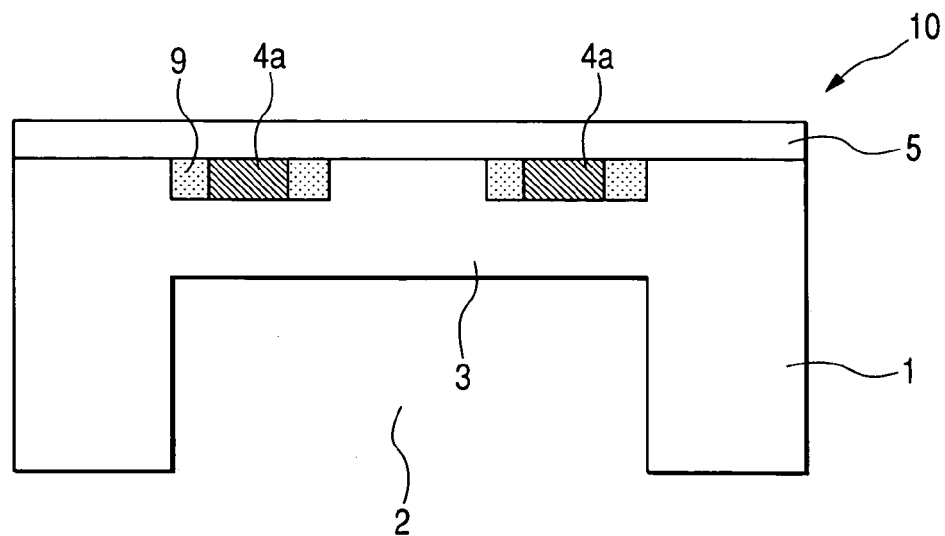

FIGS. 1A and 1B are a plan view and a cross sectional view of a piezo resistance type pressure sensor as a kind of piezo resistance type semiconductor device according to the first embodiment of the invention.

The piezo resistance type pressure sensor 10 shown in the diagrams uses a semiconductor substrate made of, for example, silicon and the hollow portion 2 is formed from the back surface side of the semiconductor substrate. The semiconductor substrate of the upper surface portion of the hollow portion 2 is used as a diaphragm 3. The diaphragm 3 has a rectangular or square flat shape. Since the portion (external periphery) surrounding the diaphragm 3 is not the hollow portion 2, a thickness of semiconductor substrate in this portion is larger than that of the region of the diaphragm 3 in correspondence to the portion of the absence of the hollow portion 2 and such an external periphery is constructed as a supporting frame 1 for the diaphragm 3.

Stress detectors 4a and 4b made of piezo resistors (diffusion resistors) are formed on the surface of the semiconductor substrate. In correspondence to each of the right and left sides (shown in the diagram) of the diaphragm 3, the stress detectors 4a are arranged so as to stride over those sides at the center portions thereof. The stress detectors 4a are provided so that the longitudinal direction faces the direction which crosses perpendicularly to the extending direction of the side of the diaphragm 3. In almost the center portions of the upper and lower sides shown in the diagram of the diaphragm 3, the stress detectors 4b are arranged near the sides of the diaphragm 3 and at the positions in the supporting frame 1. The stress detectors 4b are provided so that the longitudinal direction is parallel with the extending direction of the corresponding side. Each of the stress detectors 4a and 4b detects a pressure, as an electric signal, which is caused when the detector is distorted by the deformation of the diaphragm 3. The stress detectors 4a and 4b are Wheastone-bridge connected by a circuit pattern (not shown).

Further, according to the piezo resistance type pressure sensor, with respect to each stress detector 4a locating in the diaphragm 3, a part of the diaphragm 3 of its peripheral portion is cut off. Specifically speaking, along the external periphery of the stress detector 4a made of the piezo resistor, in the whole external periphery, the diaphragm 3 is cut off in a groove shape. Therefore, each stress detector 4a is completely surrounded by a groove 9. The portion of the cut-off groove 9 is illustrated as a mesh portion in the diagrams. A width of groove 9 is almost equal to that of the stress detector 4a (length in the direction which crosses perpendicularly to the longitudinal direction of the stress detector). The diaphragm 3 excluding the forming position of the groove 9 has substantially the same film thickness.

The diaphragm (silicon) is cut off in the groove shape at the periphery of the stress detector 4a as mentioned above. In FIGS. 1A and 1B, by removing silicon from the surface side where the device has been formed, when the diaphragm 3 is deformed by applying the pressure to the diaphragm 3, the stress is concentrated on the stress detector 4a. Thus, the stress detecting sensitivity is improved to a level higher than that of the device in which the diaphragm is not cut off in a groove shape. On the other hand, since only the portion of the groove 9 is cut off from the diaphragm 3, the mechanical strength of the diaphragm does not deteriorate substantially.

The passivation film 5 such as silicon oxide film, silicon nitride film, or the like is formed on the upper surface of the semiconductor substrate so as to cover the whole surfaces of the supporting frame 1, the diaphragm 3, and the stress detectors 4a and 4b. Since the passivation film 5 is laminated after the groove 9 is formed, the internal surface of the groove 9 is coated with the passivation film 5. However, since a thickness of passivation film 5 is thinner enough than a depth of groove 9, the groove structure remains and the stress concentration on the stress detector 4a occurs.

Since the stress detector 4 is formed by the ion-injection and diffusion of the impurities into the semiconductor substrate as will be explained hereinafter, the depth of groove 9 is set to a value which is almost equal to or larger than a diffusion depth of the impurities for forming the stress detector 4. Thus, a PN junction leakage in the lateral direction between the piezo resistance type stress detector 4 and the silicon semiconductor layer constructing the diaphragm 3 can be suppressed. In addition to the foregoing stress concentration, the detecting sensitivity of the piezo resistance type stress detector 4 and the output linearity can be improved without increasing the forming region of the diaphragm 3. In the embodiment, an area of the cut-off portion of the diaphragm 3 (portion of the groove 9) is smaller than that of the whole diaphragm 3. Since the thickness of the whole surface of the diaphragm 3 is almost equal, while a decrease in strength is prevented, the detecting sensitivity and the output linearity can be improved without increasing the forming region of the diaphragm.

Figure 2A:
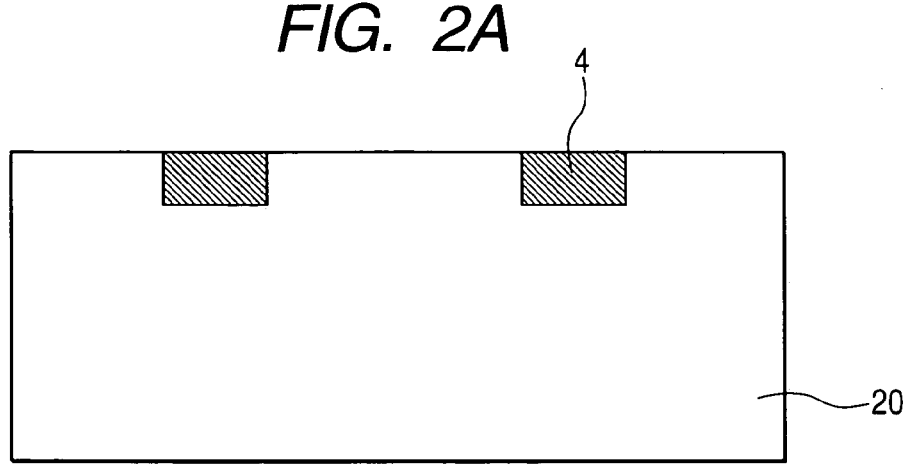
FIGS. 2A, 2B and 2C are cross sectional views sequentially showing manufacturing steps of the piezo resistance type pressure sensor shown in FIGS. 1A and 1B.
Figure 2B:
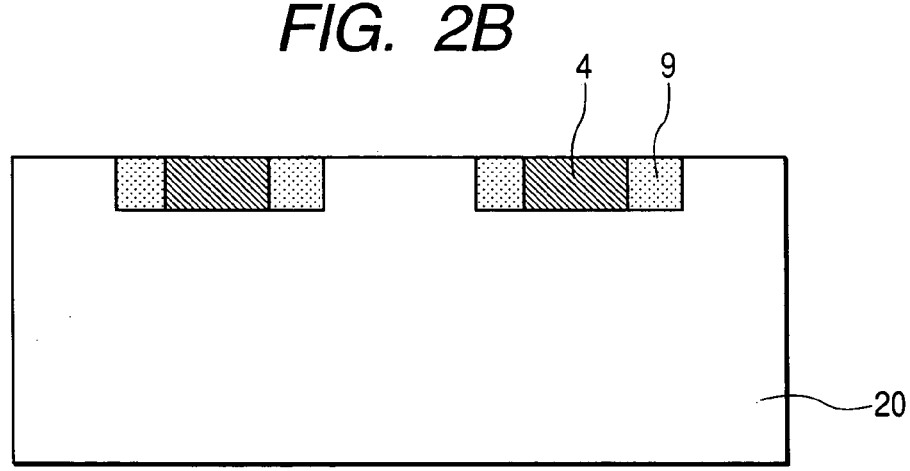
Figure 2C:
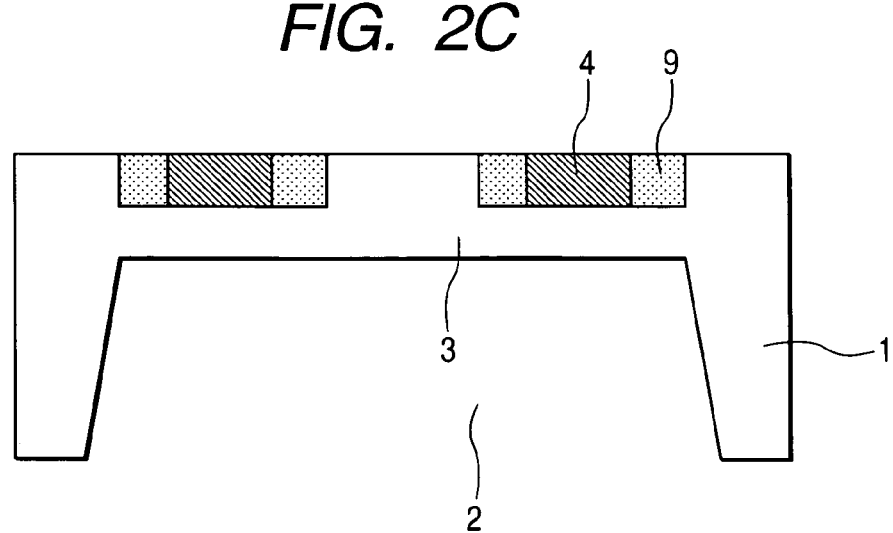

FIGS. 2A to 2C sequentially show a simple manufacturing method of the pressure sensor shown in FIGS. 1A and 1B.

As shown in FIG. 2A, first, the surface of a semiconductor substrate 20 made of silicon or the like is patterned and ions are injected therein. After that, by executing a thermal treatment, the piezo resistance type stress detector 4 is formed as a diffusion resistor (piezo resistor). Subsequently, as shown in FIG. 2B, for example, by dry etching, the groove 9 is formed only in the peripheral portion of the stress detector 4 along the whole external periphery of the stress detector 4. Since the groove 9 has a predetermined depth, a part of the semiconductor substrate is cut off. After that, as shown in FIG. 2C, silicon in the position of the hollow portion 2 is cut off from the back surface side of the semiconductor substrate 20 by anisotropic wet etching or RIE (Reactive Ion Etching), thereby forming the hollow portion 2. Consequently, the diaphragm 3 is formed. By forming the passivation film 5 such as interlayer insulation film, passivation film, or the like, a wiring pattern (not shown), and the like onto the surface of the semiconductor substrate, the pressure sensor with the structure as shown in FIGS. 1A and 1B can be manufactured.

In the embodiment, besides the rectilinear piezo resistor (diffusion resistor), a piezo resistor in the U-character shape can be used as each of the stress detectors 4a and 4b. In the case of using the U-character shaped piezo resistor, the groove is also formed in the curved inside portion of the U-character shape. As for the groove 9, since a groove formed in a part of the periphery of the stress detector 4a instead of the whole portion thereof also enables the stresses to be concentrated on the stress detector 4a, such a groove is also incorporated in the purview of the invention. The groove 9 can be also provided in only either one of the two stress detectors 4a.

Second Embodiment

Figure 3A:
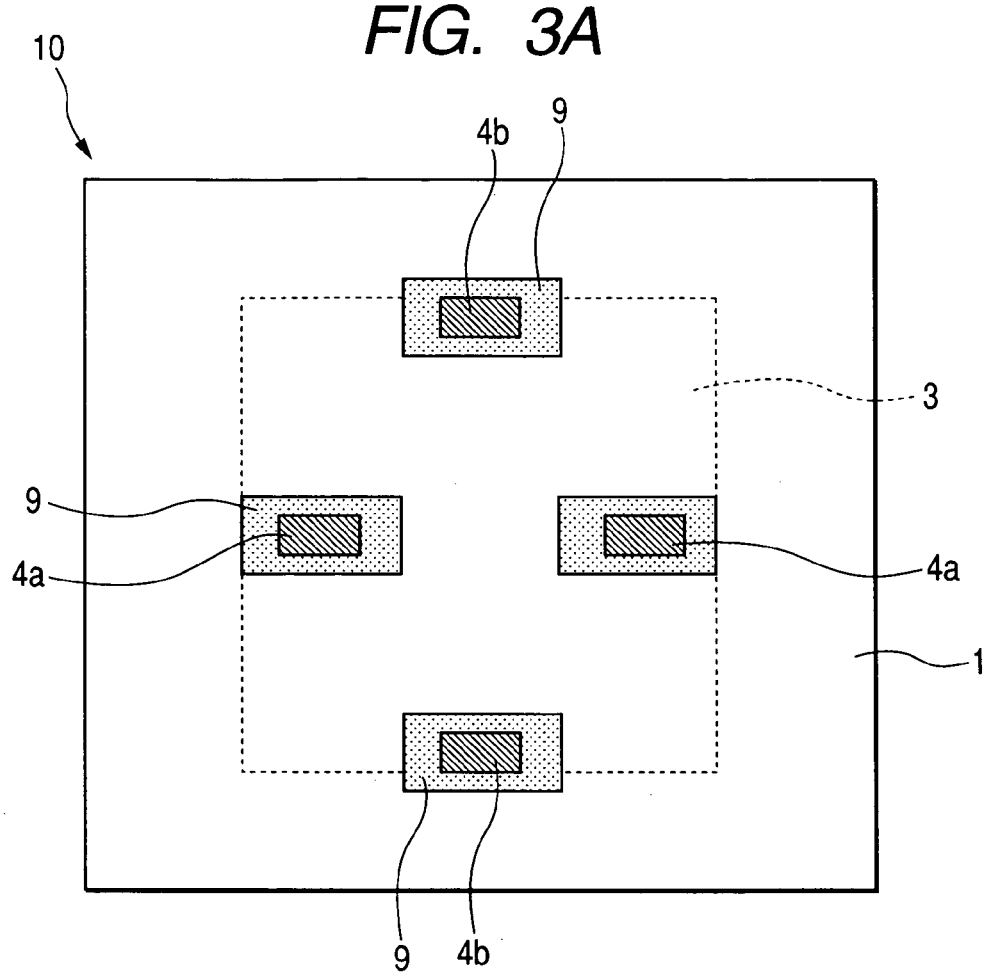
FIGS. 3A and 3B are a plan view and a cross sectional view of a piezo resistance type pressure sensor according to the second embodiment of the invention.
Figure 3B:
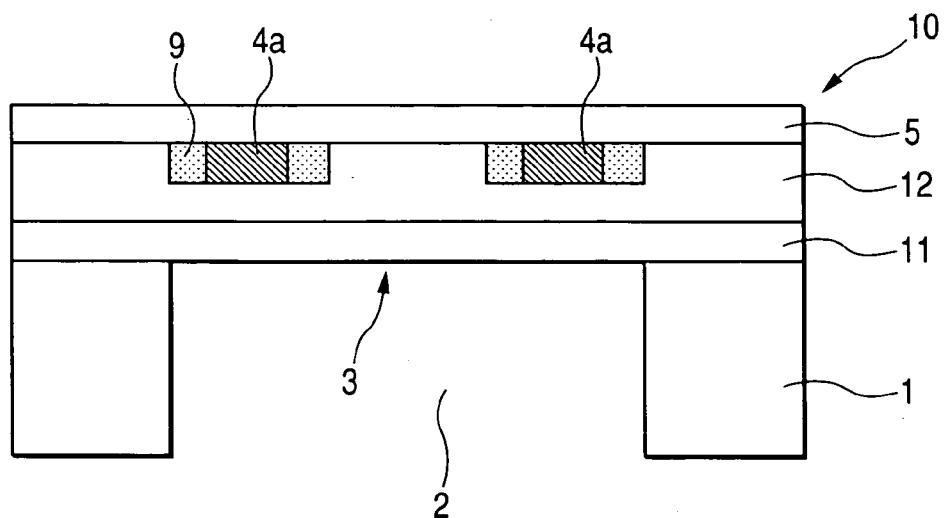

The second embodiment of the invention will now be described. FIGS. 3A and 3B are a plan view and a cross sectional view of a piezo resistance type pressure sensor as a kind of piezo resistance type semiconductor device according to the second embodiment of the invention.

Although the piezo resistance type pressure sensor of the second embodiment is similar to that of the first embodiment, the sensor of the second embodiment differs from that of the first embodiment with respect to a point that the diaphragm 3 is formed so as to have an SOI structure by using what is called an SOI (Semiconductor On Insulator) substrate as a semiconductor substrate, and the stress detectors 4b are also formed on the diaphragm 3 and the groove 9 is also formed in the periphery of each stress detector 4b. Specifically speaking, a buried insulation layer 11 and a monocrystalline semiconductor layer 12 are laminated on a silicon semiconductor layer (bulk layer) of a thick bulk in this order and a resultant laminate is used as an SOI semiconductor substrate. The hollow portion 2 is formed by removing the bulk layer from the back surface side of the SOI semiconductor substrate until the buried insulation layer 11 is exposed, thereby forming the diaphragm 3. Typically, the monocrystalline semiconductor layer 12 is made of a silicon monocrystalline layer. Therefore, the diaphragm 3 has the SOI structure comprising the buried insulation layer 11 and the monocrystalline semiconductor layer 12. In correspondence to the center portions of the upper and lower sides (shown in the diagrams) of the diaphragm 3, the stress detectors 4b are formed on the diaphragm 3 along those sides. A part of the groove 9 around the stress detector 4b can stride over the area of the supporting frame 1. Since a depth of groove 9 is smaller than a thickness of monocrystalline semiconductor layer 12, the monocrystalline semiconductor layer 12 is also exposed to the bottom surface of the groove 9.

Also in such a piezo resistance type pressure sensor, since the grooves 9 are provided around the stress detectors 4a and 4b, the stress concentration on the stress detectors 4a and 4b occurs. As compared with the device in which no grooves 9 are provided, the detecting sensitivity of the stress is improved. The strength of the diaphragm 3 does not substantially decrease. According to the device shown in the diagrams, the groove 9 is formed around the whole periphery of the stress detector 4b. However, the stress concentration on the stress detector 4b also occurs in the case where the groove 9 is formed in a part of the periphery of the stress detector 4b and such a case is also incorporated in the purview of the invention. In addition, a construction in which the groove 9 is formed around at least one of the stress detectors 4a and 4b is also incorporated in the purview of the invention.

Further, in the above pressure sensor, by using the diaphragm having the SOI structure as a diaphragm, the diaphragm 3 can be stably manufactured as a thin film. Moreover, the sensitivity is improved. By setting the depth of groove 9 to be equal to or larger than the diffusion depth of each of the piezo resistance type stress detectors 4a and 4b, the PN junction leakage in the lateral direction between the stress detectors 4a and 4b and the monocrystalline semiconductor layer 12 can be suppressed. Along-with the stress concentration on the stress detectors, the detecting sensitivity of the pressure sensor and the output linearity can be improved without increasing the forming region of the diaphragm. Also in the embodiment, the area of the cut-off portion of the diaphragm 3 is smaller than that of the whole diaphragm 3 after all. Since the thickness of the whole surface of the diaphragm 3 excluding the position of the groove 9 is almost equal, while the decrease in the strength is prevented, the detecting sensitivity and the output linearity can be improved without increasing the forming region of the diaphragm.

Figure 4A:
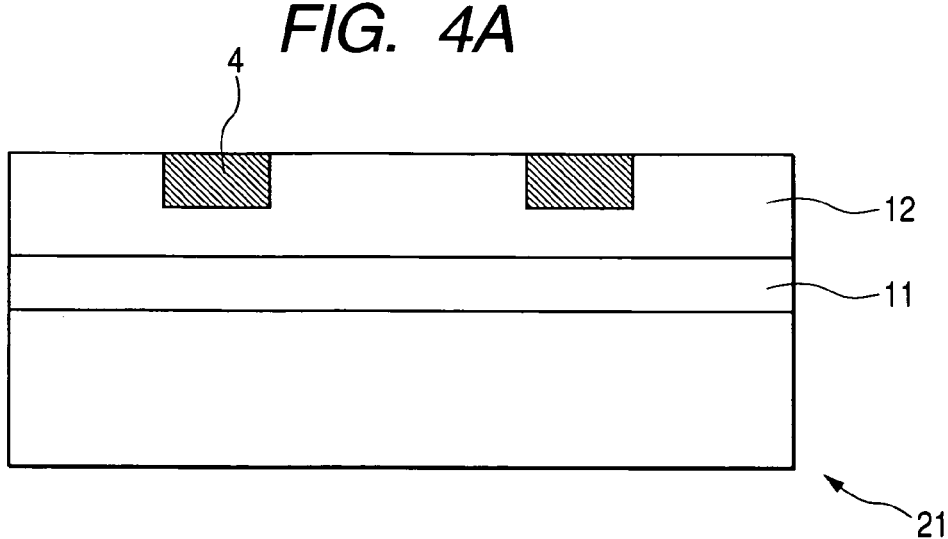
FIGS. 4A, 4B and 4C are cross sectional views sequentially showing manufacturing steps of the piezo resistance type pressure sensor shown in FIGS. 2A and 2B;.
Figure 4B:
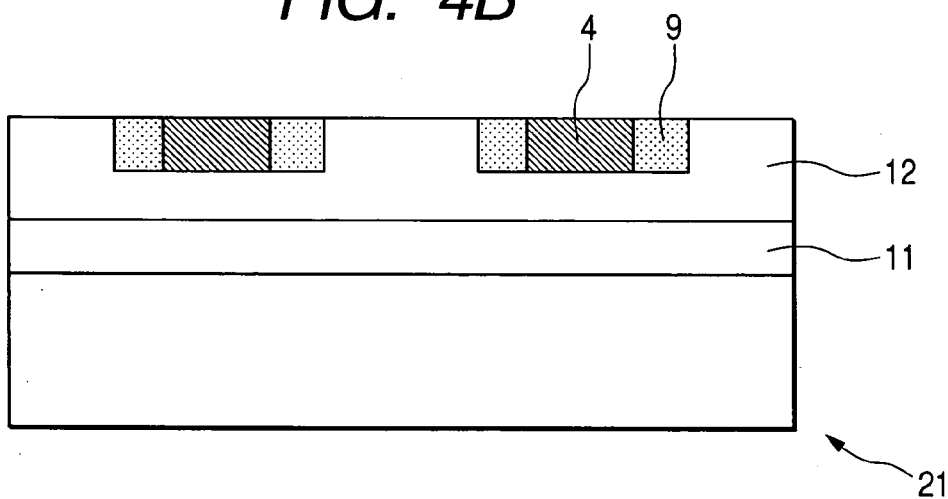
Figure 4C:
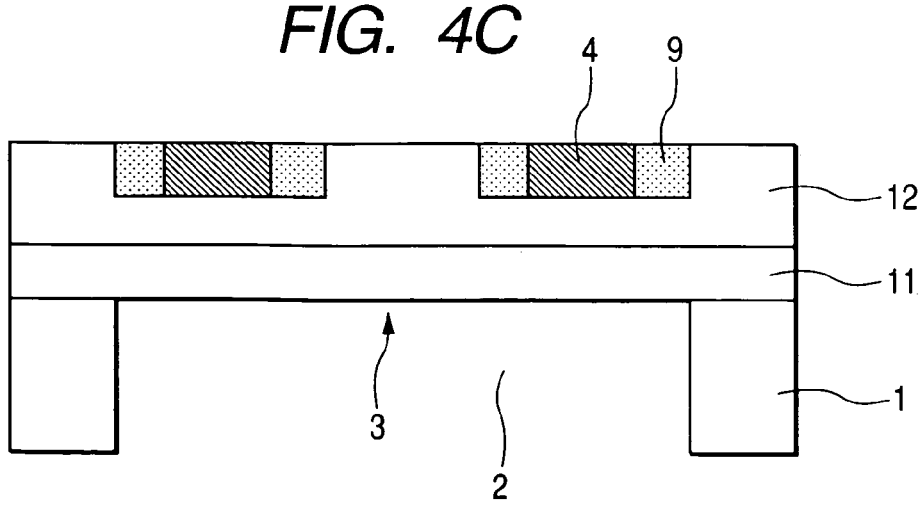

FIGS. 4A to 4C sequentially show a simple manufacturing method of the pressure sensor shown in FIGS. 3A and 3B.

First, as shown in FIG. 4A, the monocrystalline semiconductor layer 12 of the surface of an SOI substrate 21 having the layer structure-as mentioned above is patterned and ions are injected therein. After that, by executing a thermal treatment, the piezo resistance type stress detectors 4 are formed. Subsequently, as shown in FIG. 4B, for example, by the dry etching, a part of the monocrystalline semiconductor layer 12 is cut off and the grooves 9 are formed only in the peripheral portions of the stress detectors 4a and 4b. After that, as shown in FIG. 4C, the hollow portion 2 is formed by removing the bulk layer until the buried insulation layer 11 is exposed from the back surface side of the SOI substrate 21 by the anisotropic wet etching or RIE. In the embodiment, by using the buried insulation layer 11 as an etching stopper, the structure shown in FIGS. 3A and 3B can be realized with excellent controllability while controlling the film thickness of the diaphragm 3.

Third Embodiment

Figure 5A:
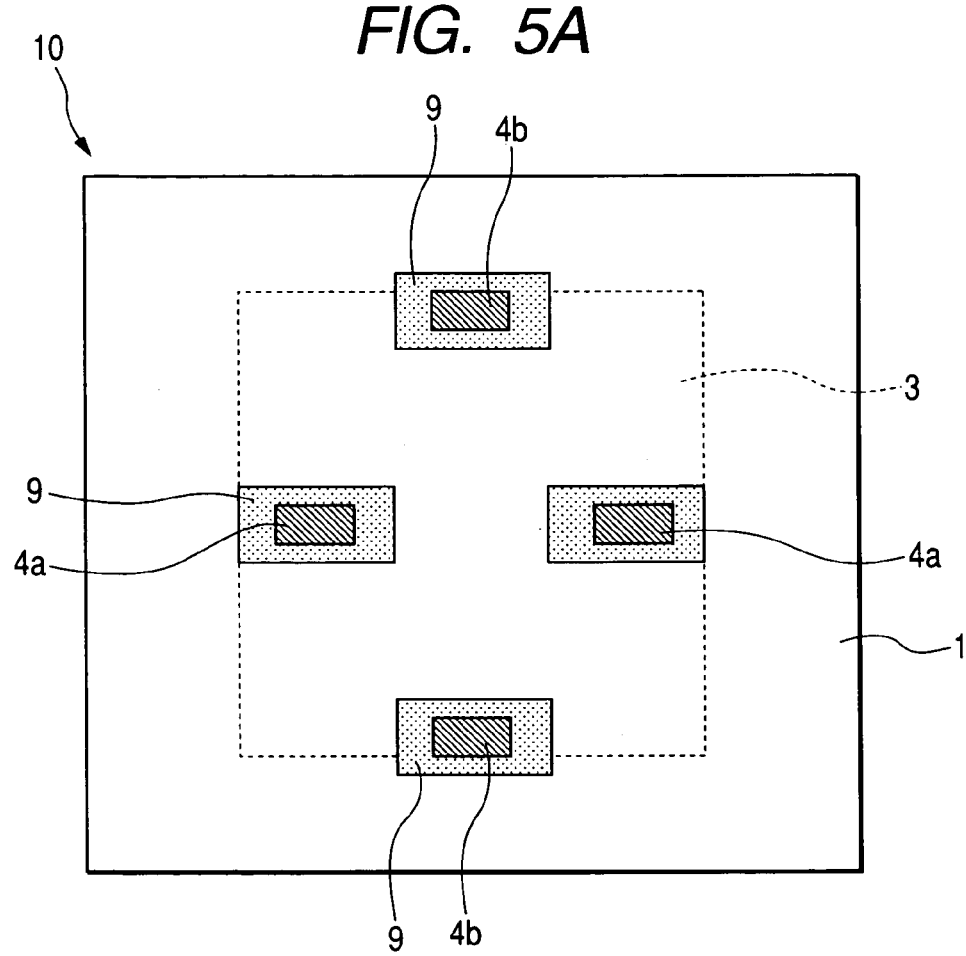
FIGS. 5A and 5B are a plan view and a cross sectional view of a piezo resistance type pressure sensor according to the third-embodiment of the invention.
Figure 5B:
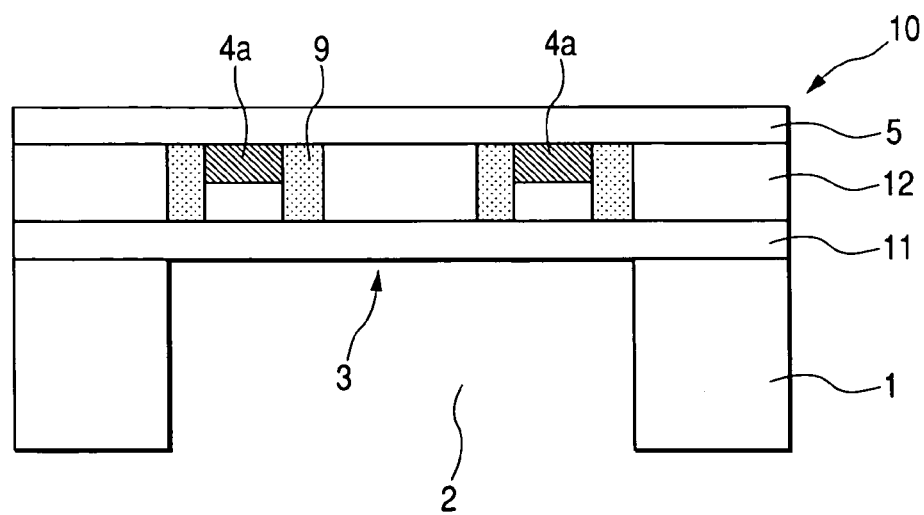

The third embodiment of the invention will now be described. FIGS. 5A and 5B are a plan view and a cross sectional view of a piezo resistance type pressure sensor as a kind of piezo resistance type semiconductor device according to the third embodiment of the invention.

The piezo resistance type pressure sensor of the third embodiment differs from that of the second embodiment with respect to a point that in at least one of the piezo resistance type stress detectors 4a and 4b, the groove 9 around the stress detector reaches a buried insulation layer 11. The groove 9 which reaches the buried insulation layer 11 completely surrounds the corresponding stress detector. By constructing the device as mentioned above, the PN junction leakage between the stress detectors and that between the stress detector and the monocrystalline semiconductor layer 12 can be suppressed. Along with the stress concentration on the stress detectors, the detecting sensitivity of the pressure sensor and the output linearity can be improved without increasing the forming region of the diaphragm. Also in the embodiment, the area of the cut-off portion of the diaphragm 3 is smaller than that of the whole diaphragm 3 after all. Since the thickness of the whole surface of the diaphragm 3 is almost equal, while the decrease in the strength is prevented, the detecting sensitivity and the output linearity can be improved without increasing the forming region of the diaphragm.

Figure 6:
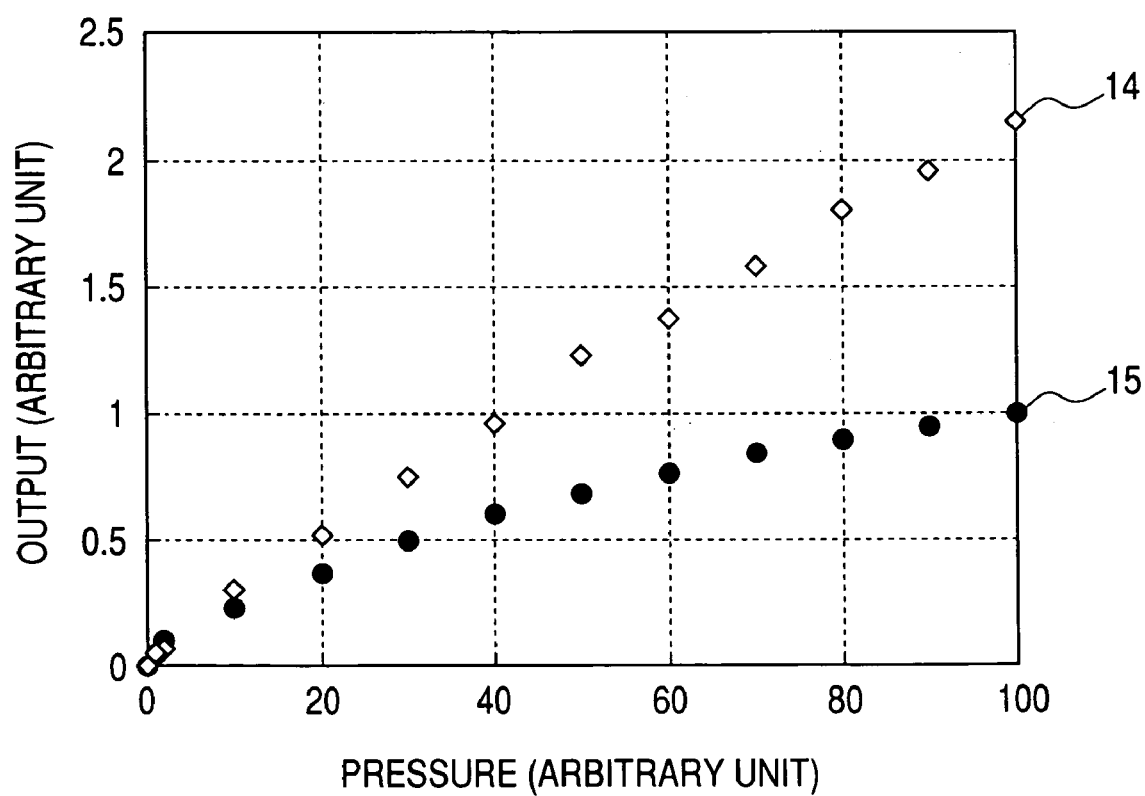
FIG. 6 is a graph showing output characteristics of the piezo resistance type pressure sensor.

Comparison results of the output characteristics of the piezo resistance type pressure sensor of the embodiment and the conventional piezo resistance type pressure sensor will be described hereinbelow. A square diaphragm in which one side is equal to 100 μm is used as a diaphragm 3 and the stress detector is provided on the diaphragm 3 in close vicinity to each side of the diaphragm 3. A size of stress detector is set to 10 μm×20 μm. In the pressure sensor based on the embodiment, the groove having a width of 5 μm is formed in the whole periphery around the stress detector and silicon existing in the position of the groove is completely removed. In the conventional pressure sensor, no groove is formed at all. Comparison results of their output characteristics to the applied pressure are shown in FIG. 6. In the diagram, square marks 14 show output characteristics of the pressure sensor based on the embodiment and dot marks 15 indicate output characteristics of the conventional pressure sensor. As will be obviously understood from the diagram, the pressure sensor of the embodiment shows the output which is twice as large as that of the conventional one and the output linearity is also improved.

Figure 7A:
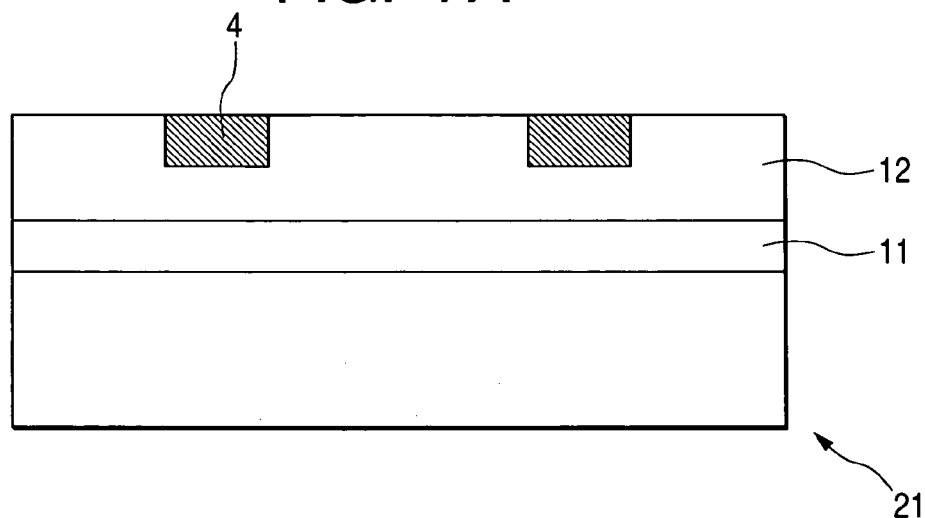
FIGS. 7A, 7B and 7C are cross sectional views sequentially showing manufacturing steps of the piezo resistance type pressure sensor shown in FIGS. 5A and 5B.
Figure 7B:
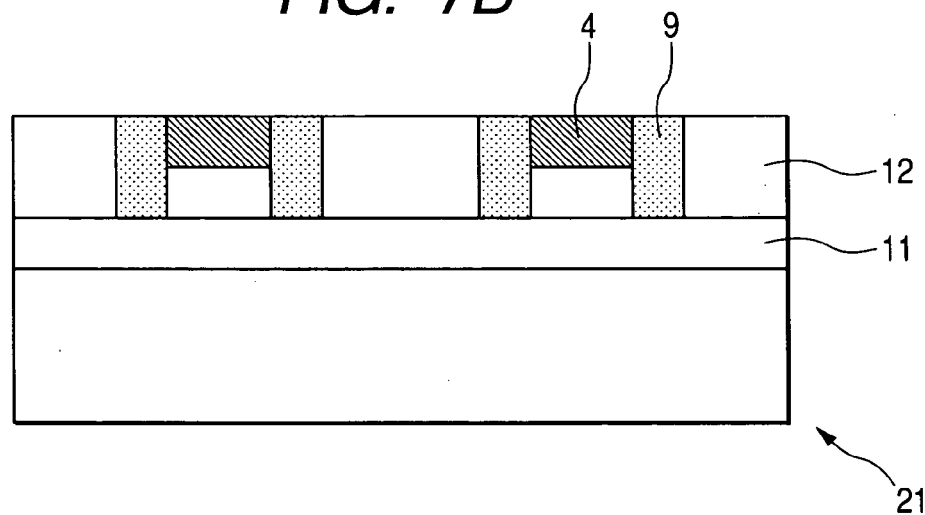
Figure 7C:
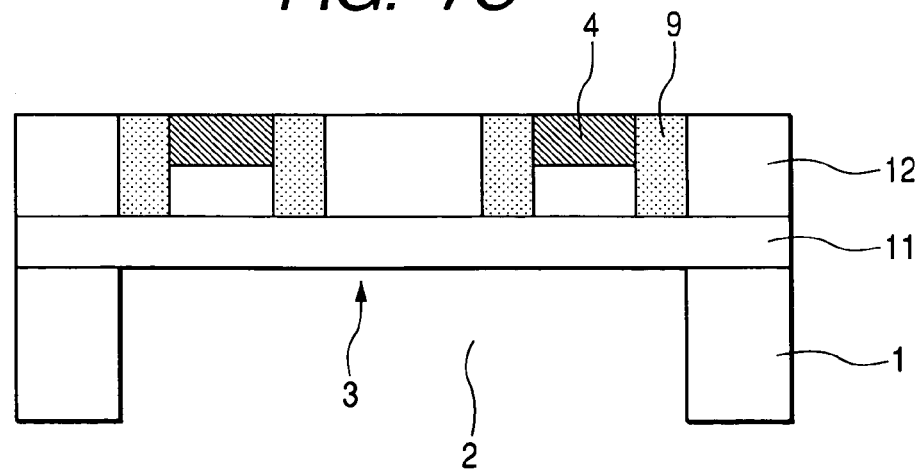

FIGS. 7A to 7C sequentially show a simple manufacturing method of the pressure sensor shown in FIGS. 5A and 5B.

First, as shown in FIG. 7A, the monocrystalline semiconductor layer 12 of the surface of the SOI substrate 21 having the layer structure as mentioned above is patterned and ions are injected therein. After that, by executing a thermal treatment, the piezo resistance type stress detectors 4 are formed. Subsequently, as shown in FIG. 7B, for example, by the dry etching, the whole portion of the monocrystalline semiconductor layer 12 is cut off and the grooves 9 which reach the buried insulation layer 11 are formed only in the peripheral portions of the stress detectors 4a and 4b. Specifically speaking, the grooves 9 are formed along the whole external peripheries of the stress detectors 4a and 4b. After that, as shown in FIG. 7C, the hollow portion 2 is formed by removing the bulk layer until the buried insulation layer 11 is exposed from the back surface side of the SOI substrate 21 by the anisotropic wet etching or RIE. In the embodiment, by using the buried insulation layer 11 as an etching stopper, the structure shown in FIGS. 5A and 5B can be realized with excellent controllability while controlling the film thickness of the diaphragm 3.

In the piezo resistance type pressure sensor described above, the grooves formed around the stress detectors can be also used for the device separation between the stress detectors or the device separation between the stress detector and its peripheral semiconductor layer. Therefore, the construction of the embodiment differs from a construction in which the pressure sensor is formed by executing both of the step of forming the stress detectors by patterning and the step of forming the grooves so as to be matched with the stress detectors. By forming the grooves after the diffusion layers serving as stress detectors are formed on the whole surface of the semiconductor substrate, the stress detectors matched with the grooves can be formed. By using such steps, the patterning step of forming only the stress detectors becomes unnecessary. Therefore, the number of steps and the time necessary for the manufacturing steps can be reduced as a whole. A method of manufacturing the pressure sensors by forming the diffusion layers onto the whole surface of the semiconductor substrate and, thereafter, forming the grooves will be described hereinbelow.

FIGS. 8A to 8E sequentially show the steps of manufacturing the pressure sensor shown in FIGS. 1A and 1B.

Figure 8A:
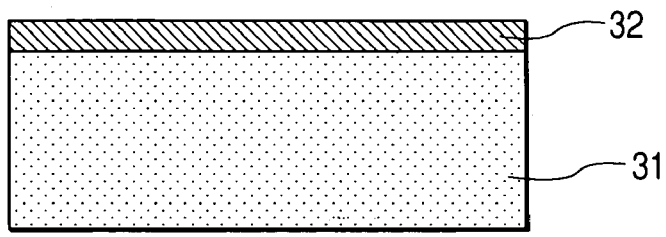
FIGS. 8A, 8B, 8C, 8D and 8E are cross sectional views sequentially showing an example of the manufacturing steps of the piezo resistance type pressure sensor.

First, as shown in FIG. 8A, a diffusion layer 32 is formed on the surface of a silicon substrate 31 by the ion injecting method or the like.

Figure 8B:
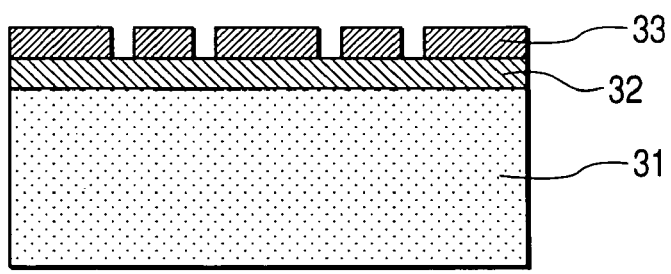
Figure 8C:
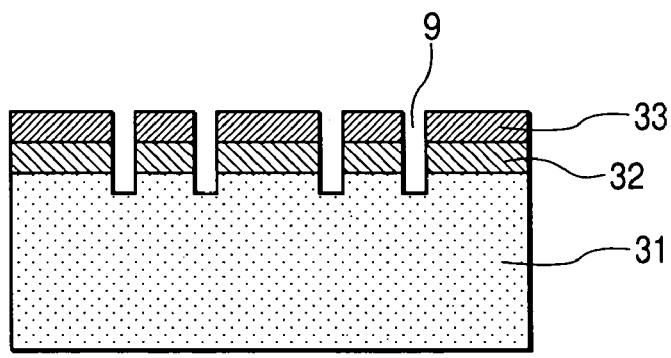
Figure 8D:
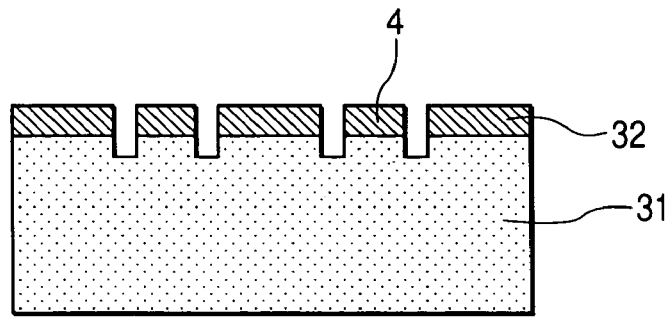
Figure 8E:
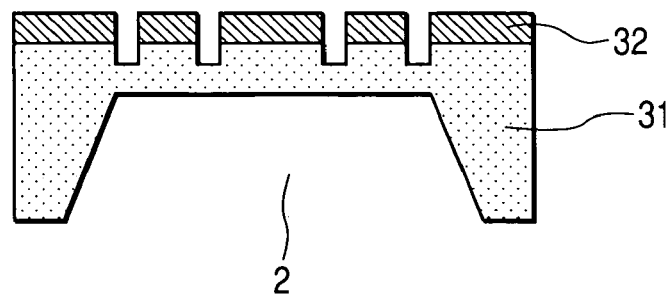

Subsequently, as shown in FIG. 8B, the upper surface of the silicon substrate 31 formed with the diffusion layer 32 is coated with a photoresist 33. The photoresist 33 is patterned so that the groove portion surrounding the stress detector becomes an opening portion. Then, as shown in FIG. 8C, the diffusion layer 32 is divided into a plurality of regions by performing the etching from the opening portion of the photoresist 33. Among the divided regions, the region whose periphery is surrounded by the groove 9 by the etching becomes the stress detector 4. After that, as shown in FIG. 8D, the photoresist 33 is peeled off and an interlayer insulation film, a wiring pattern, and a passivation film (all of them are not shown) are formed and patterned. As shown in FIG. 8E, the hollow portion 2 is formed by executing the patterning and etching from the back surface side of the silicon substrate 31. Thus, the piezo resistance type pressure sensor is obtained.

An example of the pressure sensor manufactured by using the steps shown in FIGS. 8A to 8E will be specifically explained hereinbelow. The n-type silicon substrate 31 in which a diameter is equal to 150 mm, a thickness is equal to 625 μm, and a specific resistance lies within a range of 0.3 to 0.5 Ωcm is used and the diffusion layer 32 is formed by executing the ion injection from the surface of the silicon semiconductor substrate. The ion injection is executed under conditions in which ion species are $BF_2$, a dose amount is equal to $5 \times 10^{13}$ cm$^{-2}$, and an accelerating voltage is equal to 60 keV. Subsequently, the surface of the silicon substrate 31 is coated with a photoresist and patterned. Further, reactive ion etching of the silicon substrate 31 is executed from the opening portion of the photoresist 33 by using a $Cl_2$ gas. The reactive ion etching at this time is executed under etching conditions in which a pressure is equal to 0.93 Pa (7.0 mTorr), a flow rate of $Cl_2$ is equal to 180 cc/min, an anode current is set to 210 mA, a microwave output of 2.45 GHz is equal to 20 W, and a depth of silicon substrate is equal to 300 nm. In the specification, the flow rate is expressed by a value in the case where it is converted on the assumption that a temperature is set to 0° C. and a pressure is set to 0.1013 MPa. After that, a dry process by an oxygen plasma and a wet process by a mixture liquid of a sulfuric acid and hydrogen peroxide are executed and the photoresist 33 is peeled off from the silicon substrate 31. Subsequently, a thermal treatment is executed to the silicon substrate 31 under the $N_2$ atmosphere. A crystalline recovery of the ion injected portion is executed and impurities are activated under conditions in which a temperature is equal to 1000° C., time is set to 30 min., and a flow rate of $N_2$ is equal to 10 L/min. By the above processing steps, a p-type piezo resistance portion (stress detector 4) in which a surface concentration is equal to $2 \times 10$ cm$^3$ and $x_j$=0.3 μm and a resistance type temperature sensor portion are simultaneously formed. At this time, since a sheet resistance of the diffusion layer is equal to about 3 kΩ/□, such a surface concentration is enough that the device can be also used as a piezo resistor and a temperature sensor. Further, since each resistor is electrically insulated, it can be used as an independent device. After that, an interlayer insulation film, metal wirings, and a passivation film are sequentially formed and patterned on the surface side of the silicon substrate 31. The interlayer insulation film is a silicon oxide film formed by an ordinary pressure CVD method. Aluminum formed by a sputtering method is used for metal wirings. The passivation film is a silicon nitride film formed by a plasma CVD method. Further, patterning is executed to the back surface side of the silicon substrate 31, etching of the silicon substrate is executed, and a silicon diaphragm having a thickness of 3.0 μm is formed. The above forming step comprises the following three steps: (a) creation of a thin layer of the silicon substrate by mechanical grinding; (b) creation and patterning of the silicon oxide film serving as a mask material at the time of etching of the silicon substrate; and (c) creation of the diaphragm by the etching of the silicon substrate. In the step of (a), the grinding is executed up to a thickness of 233 μm from the back surface of the silicon substrate. In the step of (b), the silicon oxide film having a thickness of 2 μm is formed by the plasma CVD method. As etching in the step of (c), dry etching by a Bosch process in which plasma deposition by $C_4F_8$ and plasma etching by $SF_6$ are alternately executed is applied. At this time, since a selection ratio of silicon and the plasma oxide film is equal to 150:1, if a trench having a depth of 230 μm is formed, the plasma oxide film having a thickness of 0.5 μm remains on the back surface. By executing the above processing steps, the piezo resistance type pressure sensor having high sensitivity can be obtained by the simple processes without increasing the manufacturing costs.

As mentioned above, the piezo resistance type pressure sensor which is likely to be influenced by the temperature is often equipped with a temperature compensating circuit. According to the manufacturing process shown here, the piezo resistance type pressure sensor and the resistance type temperature sensor can be formed on the same substrate. Therefore, by adding the relatively simple step, a pressure sensor system having a temperature compensating function can be manufactured.

FIGS. 9A to 9E sequentially show another manufacturing process when the pressure sensor shown in FIGS. 1A and 1B is manufactured.

Figure 9A:
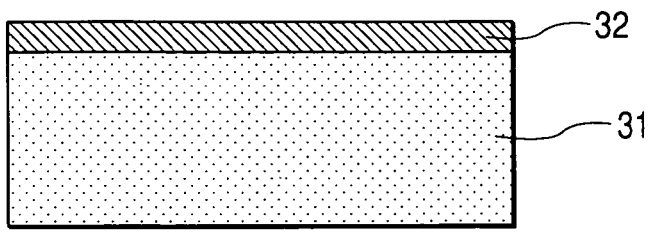
FIGS. 9A, 9B, 9C, 9D and 9E are cross sectional views sequentially showing another example of the manufacturing steps of the piezo resistance type pressure sensor.
Figure 9B:
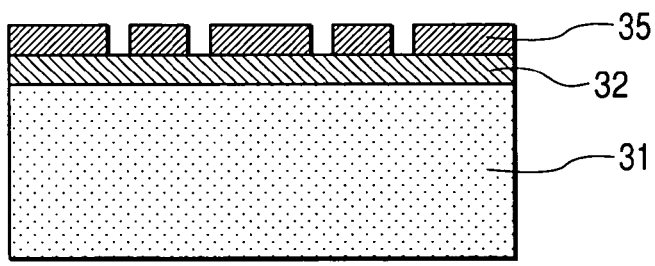
Figure 9C:
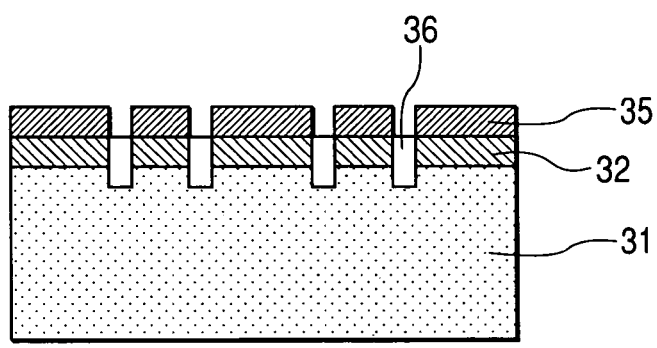
Figure 9D:
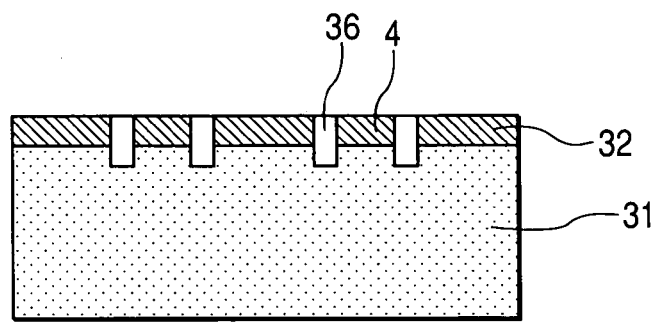
Figure 9E:
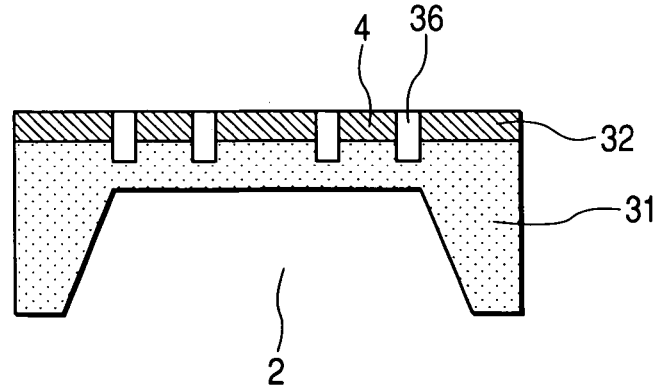

This manufacturing process differs from that shown in FIGS. 8A to 8E with respect to a point that a heat oxide film is formed by using a silicon nitride film 35 patterned by a photoresist as a mask, thereby device separating the piezo resistor portion (stress detector portion). First, as shown in FIG. 9A, the diffusion layer 32 is formed on the surface of a silicon substrate 31 by the ion injecting method or the like. As shown in FIG. 9B, the silicon nitride film 35 is formed and patterned. Subsequently, as shown in FIG. 9C, heat oxidization is performed from an opening portion of the silicon nitride film 35 and the diffusion layer 32 is divided into a plurality of regions which are electrically insulated by a silicon oxide film 36. The divided regions become the stress detectors 4. After that, as shown in FIG. 9D, the silicon nitride film 35 is peeled off and an interlayer insulation film, metal wirings, and a passivation film (all of them are not shown) are formed and patterned. As shown in FIG. 9E, the patterning and etching are executed from the back surface side of the silicon substrate 31, a diaphragm is formed on the silicon substrate 31, so that the piezo resistance type pressure sensor is obtained.

By using the steps shown in FIGS. 9A to 9E, the piezo resistance type pressure sensor can be manufactured under conditions which are almost similar to those in the case shown in FIGS. 8A to 8E. The heat oxidization is applied as a method of insulating the piezo resistance portion from the silicon substrate as mentioned above. In this case, the wet oxidization is performed as heat oxidization under conditions in which, for example, a temperature is equal to 1000° C., a time is equal to 120 min, a flow rate of $H_2$ is equal to 9 L/min, and a flow rate of $O_2$ is equal to 6 L/min.

By executing such a manufacturing process, the thickness of diaphragm is not locally largely changed. Therefore, it is possible to obtain the pressure sensor of high sensitivity without an influence of a leakage or the like while keeping enough strength at which even if an excessive pressure is applied, the sensor is not broken. By executing the heat oxidization, the crystalline recovery of the ion injected portion and the activation of the impurities can be realized. Therefore, there is no need to newly execute the thermal treatment after that. There is such an effect that the processing time and the costs can be reduced owing to the simplification of the steps. The numerical values of the heat oxidization conditions mentioned here are not limited to only the specific values shown here but can be freely selected in accordance with the object.

FIGS. 10A to 10E sequentially show the manufacturing process at the time of manufacturing the pressure sensor shown in FIGS. 5A and 5B using the SOI substrate.

Figure 10A:
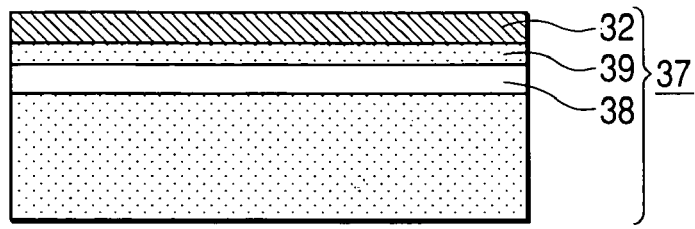
FIGS. 10A, 10B, 10C, 10D and 10E are cross sectional views sequentially showing still another example of the manufacturing steps of the piezo resistance type pressure sensor.
Figure 10B:
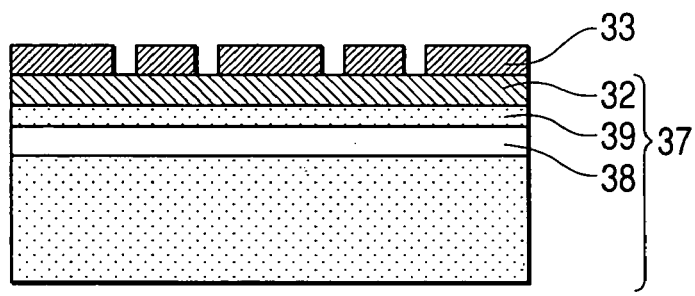
Figure 10C:
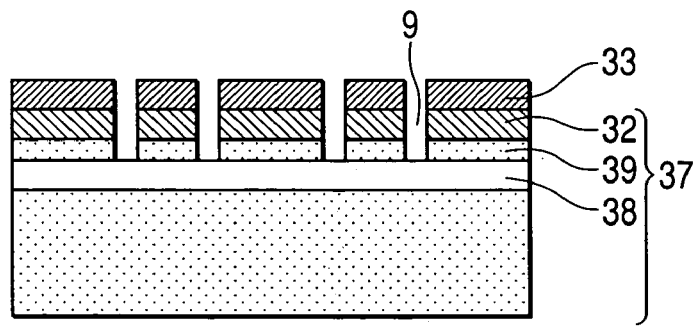
Figure 10D:
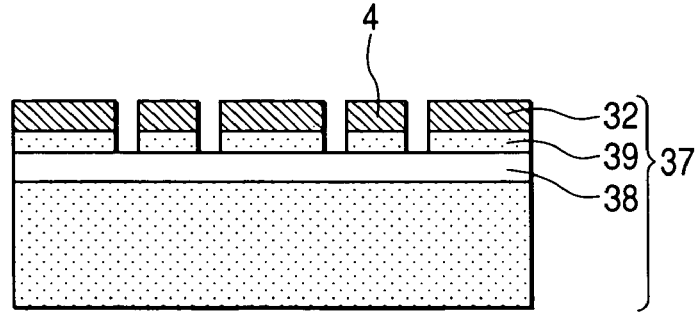
Figure 10E:
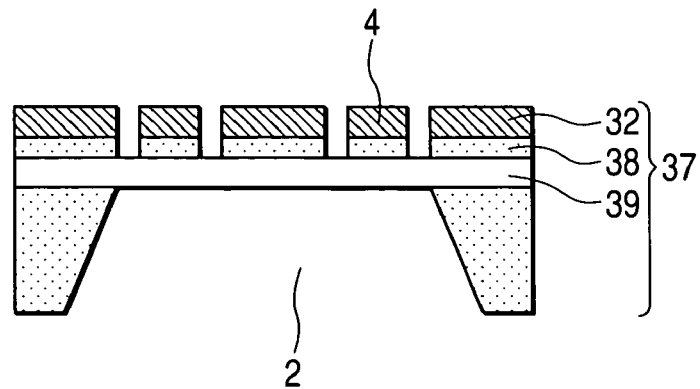
Figure 11A:
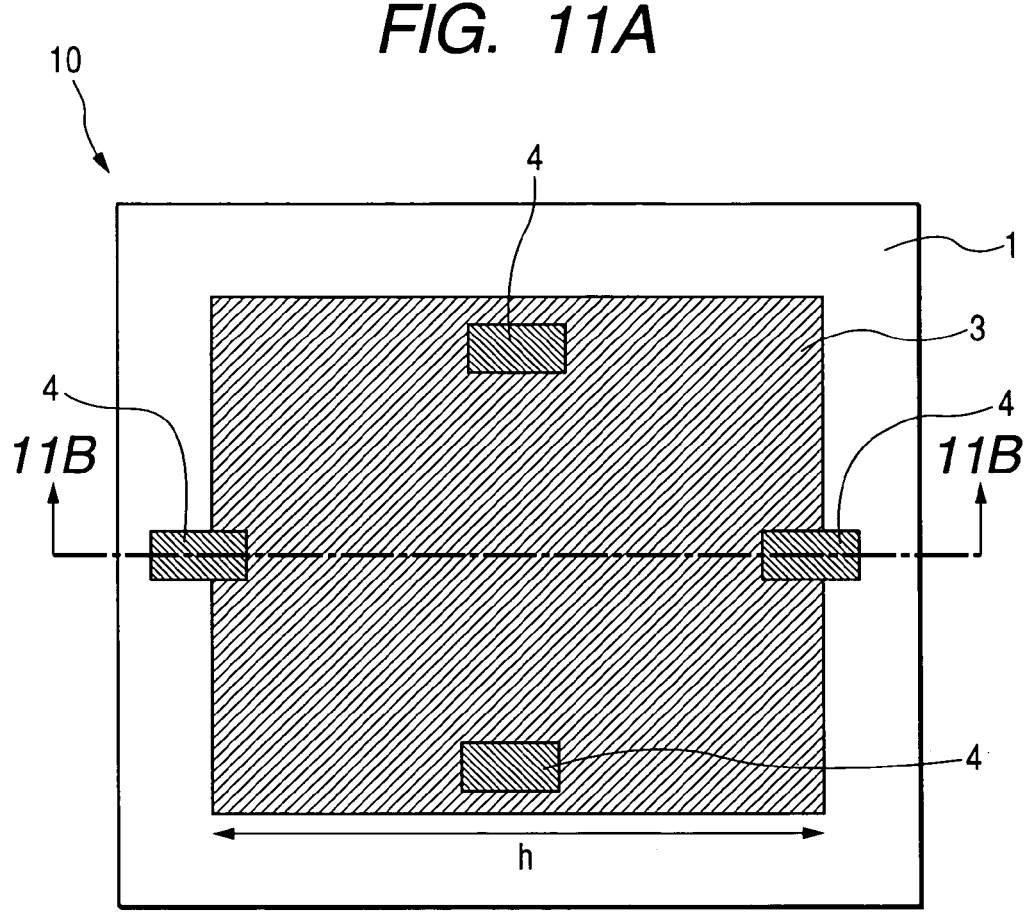
FIGS. 11A and 11B are a plan view and a cross sectional view of a conventional piezo resistance type pressure sensor.
Figure 11B:
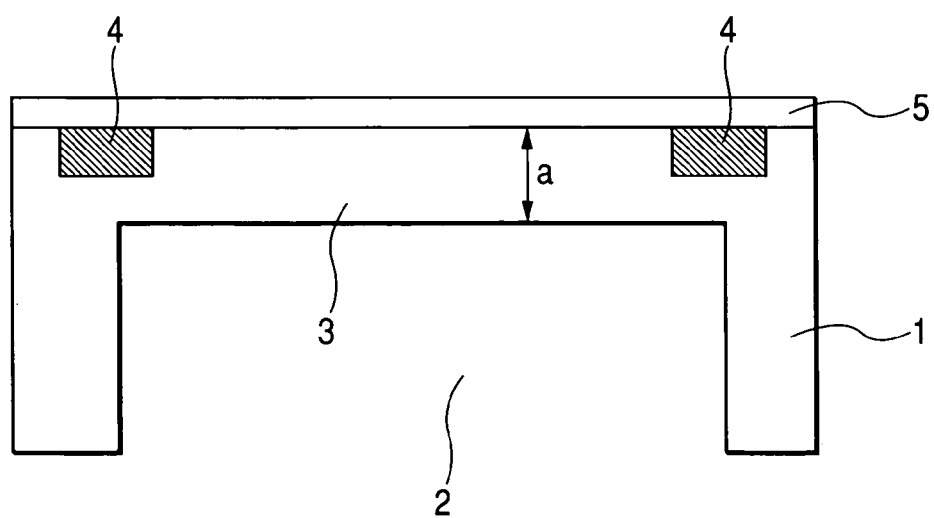
Figure 12A:
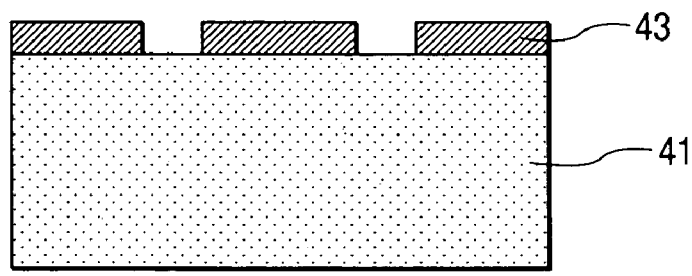
FIGS. 12A, 12B, 12C and 12D are cross sectional views sequentially showing manufacturing steps of the conventional piezo resistance type pressure sensor.
Figure 12B:
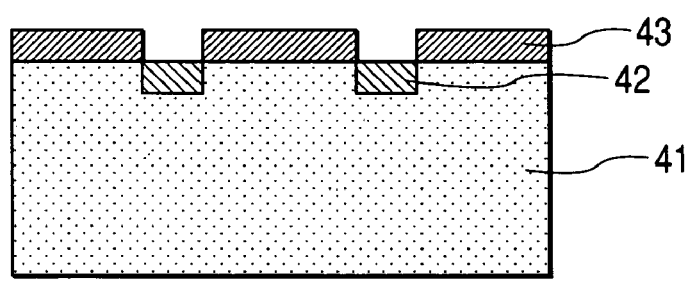
Figure 12C:
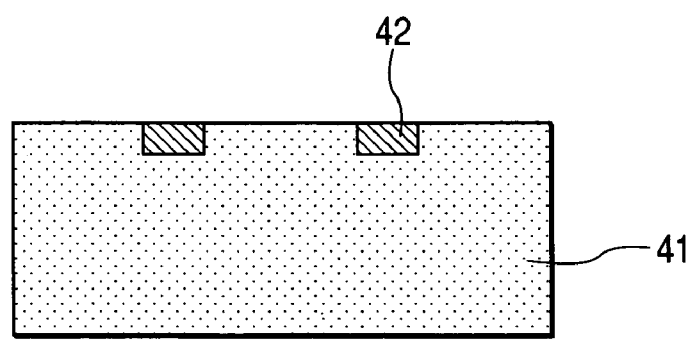
Figure 12D:
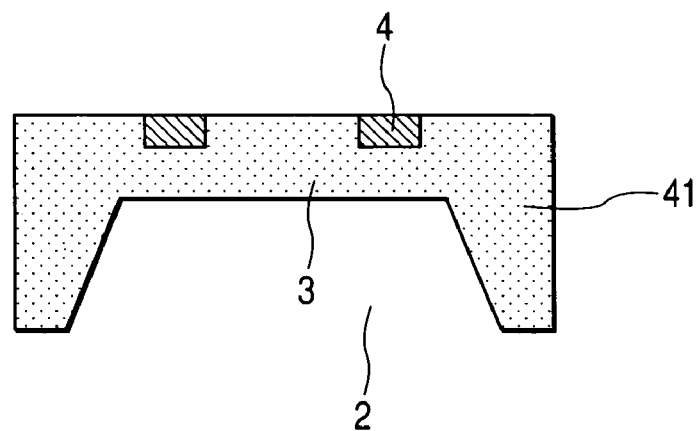
Figure 13A:
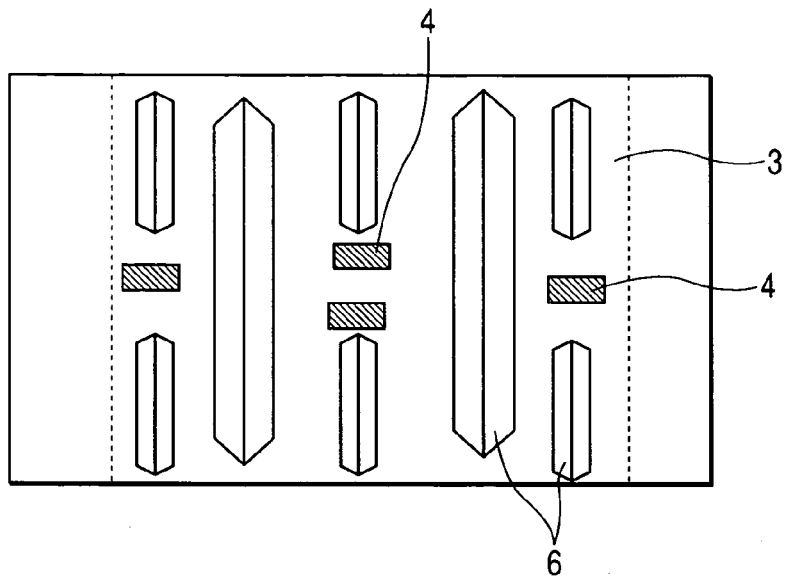
FIGS. 13A, 13B and 13C are diagrams for explaining a piezo resistance type pressure sensor disclosed in Japanese Patent Application Laid-Open No. H08-247874.
Figure 13B:
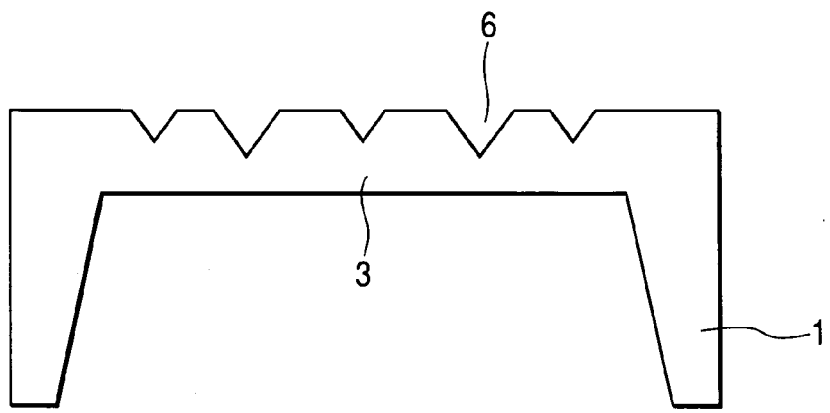
Figure 13C:
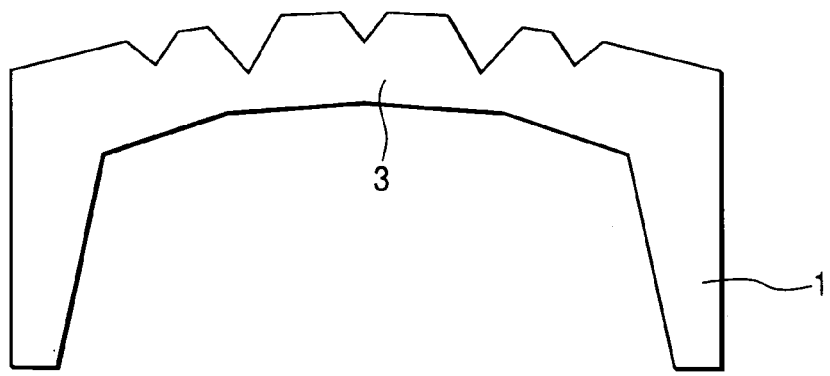
Figure 14A:
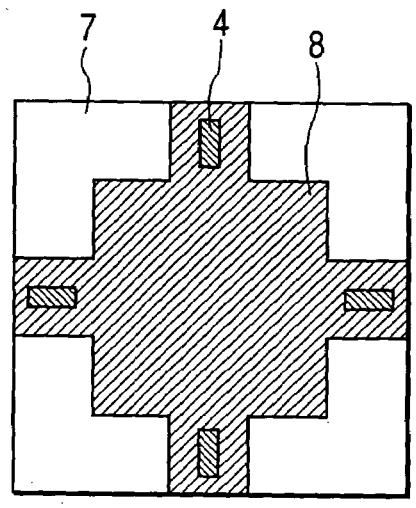
FIGS. 14A, 14B, 14C and 14D are plan views of a piezo resistance type pressure sensor disclosed in Japanese Patent Application Laid-Open No. 2002-71492.
Figure 14B:
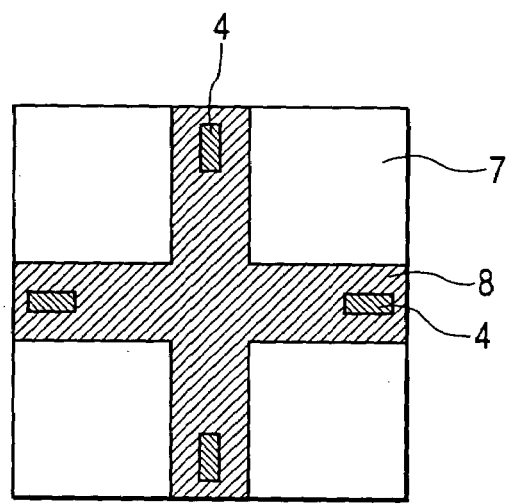
Figure 14C:
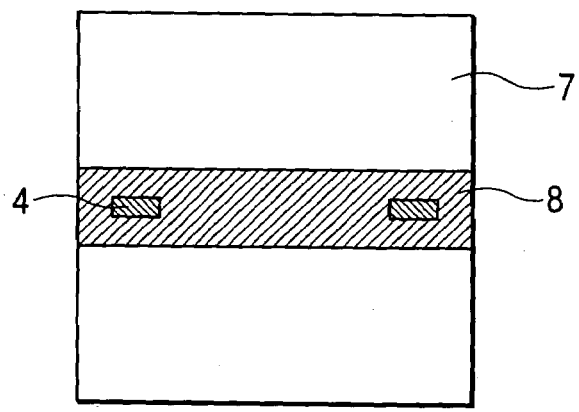
Figure 14D:
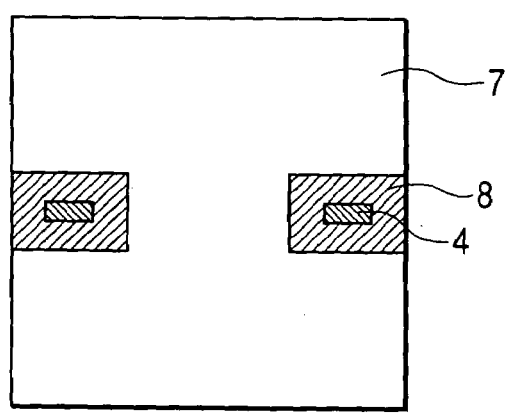

An SOI substrate 37 in which a buried insulation layer 38 and a monocrystalline silicon layer 39 are formed on a silicon layer of a bulk is used. First, as shown in FIG. 10A, the diffusion layer 32 is formed on the surface of the monocrystalline silicon layer 39 by the ion injecting method or the like. As shown in FIG. 10B, the monocrystalline silicon layer 39 formed with the diffusion layer 32 is coated with the photoresist 33 and patterned. Then, as shown in FIG. 10C, the etching is performed from the opening portion of the photoresist 33, the groove 9 is formed, and the diffusion layer 32 is divided into a plurality of regions. At this time, the groove 9 by the etching is formed down to a position where it reaches the buried insulation layer 38. After that, as shown in FIG. 10D, the photoresist 33 is peeled off and an interlayer insulation film, metal wirings, and a passivation film (all of them are not shown) are formed and patterned. Subsequently, as shown in FIG. 10E, the patterning is executed to the back surface side of the SOI substrate 37 and the etching is executed down to a position where it reaches the buried insulation layer 38. A diaphragm is formed on the SOI substrate 37 and the piezo resistance type pressure sensor is obtained.

By using the steps shown in FIGS. 10A to 10E, the piezo resistance type pressure sensor can be manufactured under conditions which are almost similar to those in the case shown in FIGS. 8A to 8E. The conditions differ from those in the case shown in FIGS. 8A to 8E with respect to a point that the SOI substrate 37 is used. In this case, there is used the SOI substrate 37 in which a silicon oxide film having a thickness of 400 nm is formed as a buried insulation layer 38 and an n-type silicon layer in which a thickness is equal to 3 μm and a specific resistance lies within a range of 0.3 to 0.5 Ωcm is formed as a monocrystalline silicon layer 39 on an n-type silicon substrate as a bulk layer in which a thickness is equal to 625 μm and a specific resistance lies within a range of 1 to 4 Ωcm, respectively. When the dry etching of silicon by the Bosch process mentioned above is executed, the progress of the etching is stopped by the silicon oxide film. Therefore, a uniform diaphragm having a thickness of 3.4 μm and having the n-type silicon layer and the silicon oxide film can be formed. Thus, the piezo resistance portion (stress detector portion) is completely insulated from the silicon substrate and the thickness of diaphragm does not locally largely change. The pressure sensor of high sensitivity without an influence of the leakage or the like while keeping an enough strength at which the sensor is not broken even if an excessive pressure is applied can be obtained by the simple process. There is also such an effect that the diaphragm of a uniform thickness can be precisely formed by using the buried insulation layer as an etching stopper at the time of forming the diaphragm. The numerical values of the specifications and the like of the SOI substrate mentioned here are not limited to only the specific values shown here but can be freely selected in accordance with the object.

Fourth Embodiment

Figure 15A:
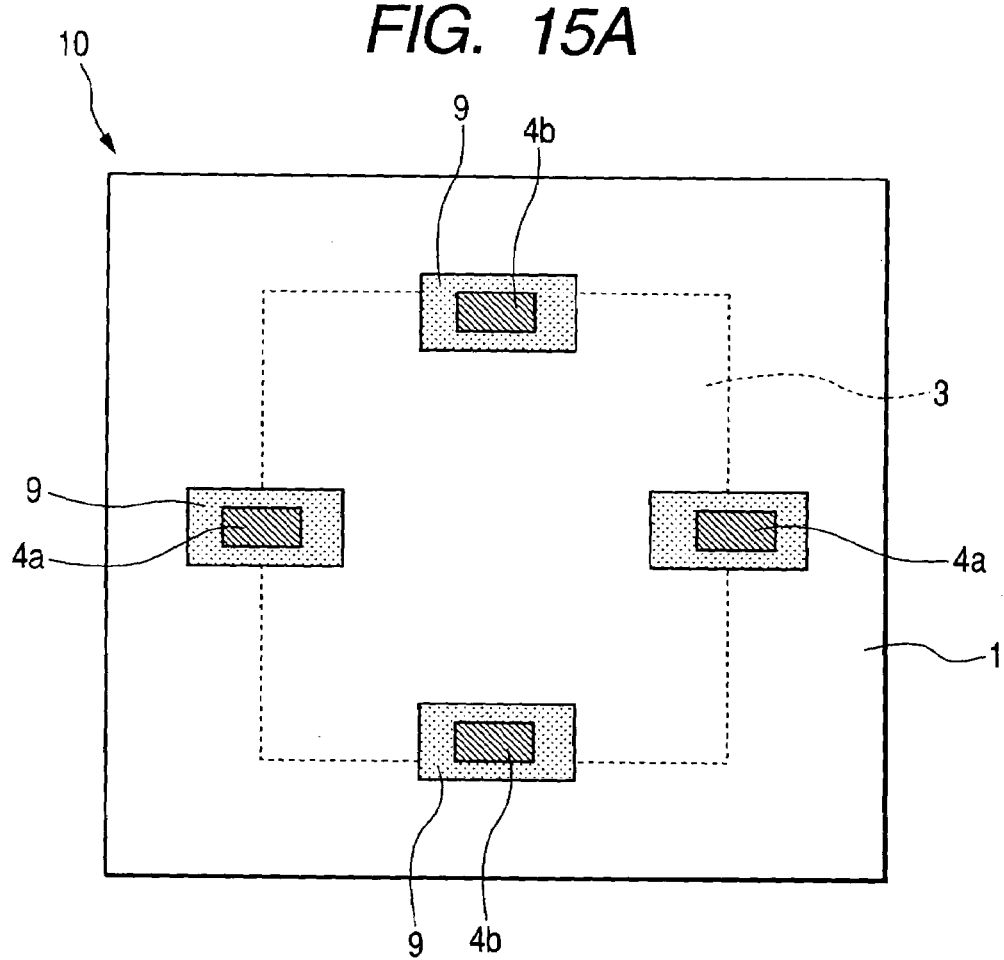
FIGS. 15A and 15B are a plan view and a cross sectional view of a piezo resistance type pressure sensor according to the fourth embodiment of the invention.
Figure 15B:
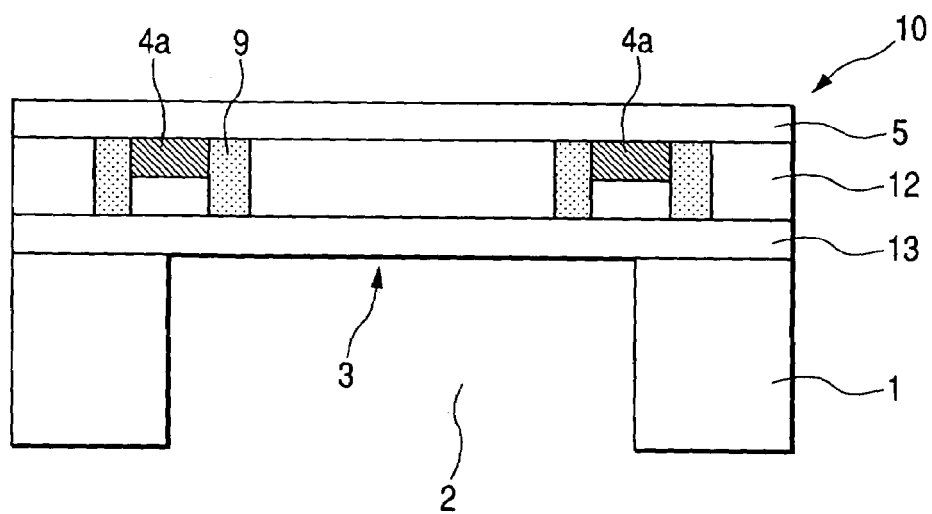

The fourth embodiment of the invention will now be described. FIGS. 15A and 15B are a plan view and a cross sectional view of a piezo resistance type pressure sensor as a kind of piezo resistance type semiconductor device according to the fourth embodiment of the invention.

The piezo resistance type pressure sensor of the fourth embodiment differs from that of the third embodiment with respect to a point that in at least one of the piezo resistance type stress detectors 4a and 4b, the groove 9 around the stress detector reaches the buried insulation layer 13. The groove 9 which reaches the buried insulation layer 13 completely surrounds the corresponding stress detector. By constructing the device as mentioned above, the PN junction leakage between the stress detectors and that between the stress detector and the monocrystalline semiconductor layer 12 can be suppressed. Along with the stress concentration on the stress detectors, the detecting sensitivity of the pressure sensor and the output linearity can be improved without increasing the forming region of the diaphragm. At lease one piezo resistance type stress detector 4a is arranged in a position where it strides over a border line of the diaphragm 3 and the supporting frame 1 where the stress is concentrated most, so that the sensitivity can be further improved. Also in the embodiment, the area of the cut-off portion of the diaphragm 3 is smaller than that of the whole diaphragm 3 and the thickness of the whole surface of the diaphragm 3 is almost equal. While the decrease in the strength is prevented, the detecting sensitivity and the output linearity can be improved without increasing the forming region of the diaphragm.

Fifth Embodiment

Figure 16A:
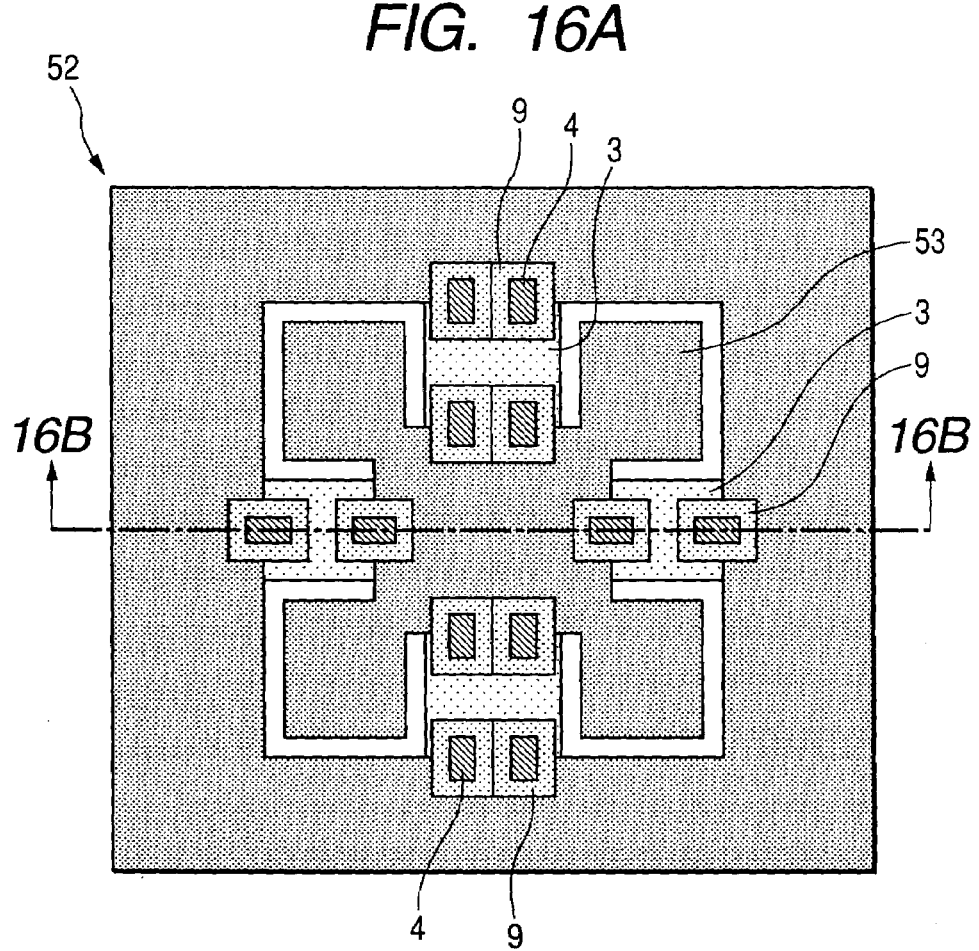
FIGS. 16A and 16B are a plan view and a cross sectional view of a piezo resistance type acceleration sensor according to the fifth embodiment of the invention.
Figure 16B:
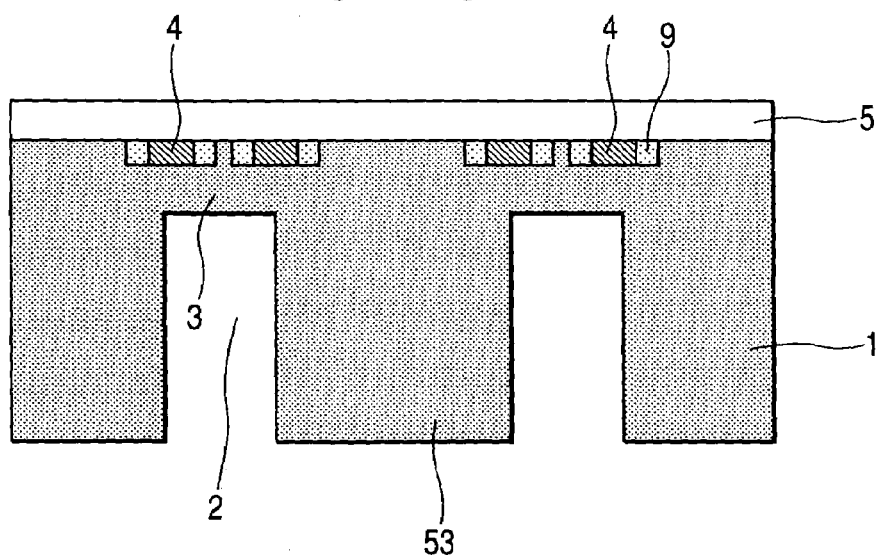

The fifth embodiment of the invention will now be described. FIGS. 16A and 16B are a plan view and a cross sectional view of a piezo resistance type acceleration sensor as a kind of piezo resistance type semiconductor device according to the fifth embodiment of the invention. A piezo resistance type acceleration sensor 52 is constructed by: the supporting frame 1 formed by a semiconductor substrate having the hollow portion 2; and the semiconductor diaphragm 3 which is deformed by applying an external force to the upper surface of the hollow portion 2. The sensor has: the piezo resistance type stress detectors 4 each for detecting a stress, as an electric signal, which is caused when the detector is distorted by the deformation of the diaphragm 3; and a dead weight 53 for promoting the deformation of the diaphragm. The dead weight 53 when it is seen from a top surface has an almost rectangular shape and is connected to the supporting frame 1 near the center of each side of the rectangle through the diaphragm 3. That is, the dead weight 53 is supported to the supporting frame 1 at four points. In the other positions, the dead weight 53 is separated from the supporting frame 1. According to the piezo resistance type acceleration sensor, when the acceleration is applied, the external force which is equal to the product of a mass of the dead weight and a magnitude of the acceleration is applied to the dead weight 53. Therefore, the acceleration applied to the acceleration sensor can be obtained by detecting the stress which is caused when the diaphragm 3 is deformed by the external force.

In the piezo resistance type acceleration sensor 52, a part of the groove 9 of the diaphragm 3 only in the peripheral portion of at least one piezo resistance type stress detectors 4 is cut off. Consequently, the stress concentration occurs and the sensitivity is improved as compared with that in the case where the peripheral portion is not cut off. There is no decrease in strength. Since the depth of cut-off of a part of the groove 9 of the diaphragm 3 is set to be equal to or larger than the diffusion depth of the piezo resistance type stress detector 4, the PN junction leakage in the lateral direction between the piezo resistance type stress detector 4 and the diaphragm 3 can be suppressed. Along with the stress concentration on the piezo resistance type stress detectors 4, the detecting sensitivity and the output linearity can be improved without increasing the forming region of the piezo resistance type acceleration sensor. The area of the cut-off portion of a part of the groove 9 of the diaphragm 3 is smaller than that of the diaphragm 3 and the thickness of the whole surface of the diaphragm 3 is almost equal. Therefore, while the decrease in the strength is prevented, the detecting sensitivity and the output linearity can be improved without increasing the forming region of the piezo resistance type acceleration sensor.

The manufacturing processes shown in FIGS. 8A to 8E and 10A to 10E are suitable when they are applied to, for example, the manufacturing of the piezo resistance type semiconductor devices which are used in the fields of automobiles, household appliances, industrial apparatuses, measuring instruments, medical equipment, and the like.

This application claims priority from Japanese Patent Application No. 2004-176856 filed Jun. 15, 2004, and Japanese Patent Application No. 2004-380491 filed Dec. 28, 2004 which are hereby incorporated by reference herein.

What is claimed is:

1. A piezo resistance type semiconductor device comprising:
   a diaphragm;
   a supporting frame which supports said diaphragm at an external periphery thereof and is formed relatively thicker than said diaphragm; and
   piezo resistance type stress detectors each for detecting a stress caused when said detector is distorted by deformation of said diaphragm by application of an external force to said diaphragm,
   wherein in at least one of said piezo resistance type stress detectors, at least a part of said diaphragm is cut off in a position where said diaphragm is come into contact with said piezo resistance type stress detector.

2. A device according to claim 1, wherein a groove surrounding said piezo resistance type stress detector is formed, so that at least a part of said diaphragm is cut off.

3. A device according to claim 1, wherein each of said supporting frame and said diaphragm are made of a semiconductor substrate.

4. A device according to claim 1, wherein each of said supporting frame and said diaphragm are made of a semiconductor substrate, said piezo resistance type stress detector is formed by injection and diffusion of impurities into said semiconductor substrate, a groove surrounding a whole periphery of at least said one piezo resistance type stress detector is formed, so that at least a part of said diaphragm is cut off, and said groove has a depth which is equal to or larger than a diffusion depth of said impurities.

5. A device according to claim 2, wherein said groove is filled with an insulation material.

6. A device according to claim 1, wherein said diaphragm has an SOI structure having an insulation layer and a monocrystalline semiconductor layer formed on said insulation layer, said piezo resistance type stress detector is formed in said monocrystalline semiconductor layer, and at least a part of said monocrystalline semiconductor layer is cut off in a position where it is come into contact with said at least one piezo resistance type stress detector.

7. A device according to claim 6, wherein a groove surrounding a whole periphery of said at least one piezo resistance type stress detector is formed in said monocrystalline semiconductor layer.

8. A device according to claim 7, wherein said groove is formed in the whole periphery of the corresponding piezo resistance type stress detector and said monocrystalline semiconductor layer is completely cut off in a forming position of said groove.

9. A device according to claim 1, wherein almost a whole surface of said diaphragm has the same film thickness in regions except for the region where at least a part of said diaphragm has been cut off.

10. A device according to claim 6, wherein almost a whole surface of said diaphragm has the same film thickness in regions except for the region where at least a part of said monocrystalline semiconductor layer has been cut off.

* * * * *

UNITED STATES PATENT AND TRADEMARK OFFICE
CERTIFICATE OF CORRECTION

| | | |
|---|---|---|
| PATENT NO. | : 7,159,466 B2 | Page 1 of 2 |
| APPLICATION NO. | : 11/149146 | |
| DATED | : January 9, 2007 | |
| INVENTOR(S) | : Shin Hasegawa et al. | |

It is certified that error appears in the above-identified patent and that said Letters Patent is hereby corrected as shown below:

COLUMN 1:

Line 29, "dashes" should read --dashed--.

COLUMN 2:

Line 64, "uniform the thickness of" should read --make uniform the thickness of the--.

COLUMN 4:

Line 29, "have" should read --has--.

COLUMN 8:

Line 32, "stride" should read --cross--.

COLUMN 12:

Line 30, "oxidization" should read --oxidation--;
    Line 45, "oxidization" should read --oxidation--;
    Line 48, "oxidization" should read --oxidation--;
    Line 59, "oxidization" should read --oxidation--; and
    Line 65, "oxidization" should read --oxidation--.

UNITED STATES PATENT AND TRADEMARK OFFICE
CERTIFICATE OF CORRECTION

PATENT NO. : 7,159,466 B2
APPLICATION NO. : 11/149146
DATED : January 9, 2007
INVENTOR(S) : Shin Hasegawa et al.

It is certified that error appears in the above-identified patent and that said Letters Patent is hereby corrected as shown below:

COLUMN 14:

Line 14, "strides" should read --crosses--.

Signed and Sealed this

Nineteenth Day of June, 2007

JON W. DUDAS
*Director of the United States Patent and Trademark Office*